(12) United States Patent
Li et al.

(10) Patent No.: US 6,822,551 B2
(45) Date of Patent: Nov. 23, 2004

(54) SYSTEM FOR COMMUNICATION WITH A VEHICLE IN CLOSE PROXIMITY TO A FIXED SERVICE PORT

(75) Inventors: Edward Wing Ping Li, Vancouver (CA); Henrik Thorning Christensen, Tsawwassen (CA); Bruce Stephen Jenner, Vancover (CA); William Edward Mufford, Township of Langley (CA); Curtis Michael Robin, Vancouver (CA)

(73) Assignee: General Hydrogen Corporation, Seattle, WA (US)

(*) Notice: Subject to any disclaimer, the term of this patent is extended or adjusted under 35 U.S.C. 154(b) by 170 days.

(21) Appl. No.: 10/298,160

(22) Filed: Nov. 14, 2002

(65) Prior Publication Data

US 2004/0095230 A1 May 20, 2004

(51) Int. Cl.[7] .................................................. G06F 7/04
(52) U.S. Cl. ..................... 340/5.1; 340/5.2; 340/10.1; 340/531
(58) Field of Search ................... 340/5.1, 5.2, 5.21, 340/10.1, 10.3, 10.42, 10.5, 539.23, 531

(56) References Cited

U.S. PATENT DOCUMENTS

| | | | |
|---|---|---|---|
| 4,338,587 A | 7/1982 | Chiappetti | 340/32 |
| 5,072,380 A | 12/1991 | Randelman et al. | 364/406 |
| 5,204,819 A | 4/1993 | Ryan | 364/465 |
| 5,351,187 A | 9/1994 | Hassett | 364/401 |
| 5,628,351 A | 5/1997 | Ramsey, Jr. et al. | 141/98 |
| 5,635,693 A | 6/1997 | Benson et al. | 235/384 |
| 5,842,188 A * | 11/1998 | Ramsey et al. | 705/416 |
| 5,956,259 A | 9/1999 | Hartsell, Jr. et al. | 364/529.37 |
| 6,026,868 A | 2/2000 | Johnson, Jr. | 141/94 |
| 6,313,737 B1 * | 11/2001 | Freeze et al. | 340/10.1 |
| 6,456,239 B1 | 9/2002 | Werb et al. | 342/463 |
| 6,690,275 B2 * | 2/2004 | Long et al. | 340/525 |
| 6,734,798 B2 * | 5/2004 | Smith | 340/573.1 |
| 2002/0020742 A1 | 2/2002 | Streicher et al. | 235/381 |

FOREIGN PATENT DOCUMENTS

| | | |
|---|---|---|
| EP | 1038830 A2 | 9/2000 |
| WO | WO 93/19435 | 9/1993 |
| WO | WO 97/24689 | 7/1997 |
| WO | WO 01/25056 A1 | 4/2001 |

* cited by examiner

*Primary Examiner*—Toan Pham
(74) *Attorney, Agent, or Firm*—Dorsey & Whitney LLP

(57) ABSTRACT

A method and apparatus for the purpose of ensuring positioning between a fixed automatic fueling service terminal and a vehicle, such that the vehicle is identified within a close range and authorized to dock at an identified service terminal to exchange services. This is accomplished by wirelessly determining the proximity of a couplable vehicle, with respect to a docking location at the service terminal. When a vehicle is within a specified distance of an automatic fueling service terminal, known as the zone of proximity detection, the vehicle identification code and service terminal identification code are both continuously determined and passed to a multi-port station controller, for authentication of service transactions and secure service processes, including automatically fueling the vehicle.

80 Claims, 35 Drawing Sheets

SYSTEM FOR COMMUNICATION WITH A VEHICLE IN CLOSE PROXIMITY TO A FIXED SERVICE PORT

FIELD OF THE INVENTION

The present invention relates to a system for communication and coupling with a vehicle in proximity to fixed service port.

BACKGROUND OF THE INVENTION

In today's world, motor vehicles such as automobiles, trucks, and motorcycles are typically powered by internal combustion engines. In these vehicles, a liquid fossil fuel such as gasoline is ignited to transform the chemical energy in the fuel into mechanical energy that is used to drive the vehicle. Due to the scarcity of fossil fuels and the pollution from vehicles burning these fuels, alternative fuels and new vehicles powered by these alternative fuels are being developed. For example, new types of vehicles that utilize gaseous fuels are being developed and are expected to enter commercial production within the next decade.

One type of gaseous fuel powered vehicle is a fuel cell vehicle (FCV), which uses a fuel cell to electrochemically generate electricity from hydrogen fuel and uses the electricity to power the vehicle. FCVs may use pure hydrogen delivered directly from a hydrogen fueling station, or may extract hydrogen from a hydrogen-containing fuel. In the latter case, a service terminal may, for example, transmit a hydrogen-containing liquid such as methanol to the FCV, for reforming into hydrogen by an on-board methanol reformer. As another example, the FCV may have an on-board electrolyzer that uses electrolysis to extract hydrogen from water molecules supplied to the vehicle by the service terminal.

Because the FCV has different servicing requirements than gasoline-powered vehicles and because no FCV has yet to enter full-scale commercial production, no FCV servicing system is known to exist. Such an FCV servicing system would require service terminals that are configured to service FCVs. Providing such an FCV service terminal presents many challenges, including providing cost-effective and efficient systems for connecting the FCV to the service terminal.

One such challenge is identifying which vehicle is seeking coupling with a specific identified service terminal prior to the actual coupling, so that specific terminal, and none other, may be prepared for coupling with that vehicle and none other.

Another such challenge is positioning the vehicle with respect to the service terminal with sufficient accuracy that automatic coupling can be effected.

In one example of the prior art, U.S. Pat. No. 4,338,587 discloses a means of identifying moving vehicles in delineated traffic lanes for the purpose of collecting tolls. No means of linking the identity of the vehicle with the identity of the identifying unit, or any use of such linking is disclosed. In addition, U.S. Pat. No. 5,351,187 discloses a means of identifying stationary vehicles in a parking lot for the purpose of collecting parking fees dependent on the length of time the vehicle has been parked. No means of linking the identity of the vehicle with the identity of the identifying unit, or any use of such linking is disclosed. Further, U.S. Pat. No. 5,710,556 discloses an improved method of determining the location of moving vehicles in delineated traffic lanes in order to better communicate with them for the purpose of determining if they have an electronic receipt for toll paid. In this prior art, no identification of vehicles takes place in the event that they are capable of providing an electronic receipt. When they cannot, identification is effected by photographing the license plate of the offending vehicle. In a further example of prior art, International patent application no WO 93/19435 discloses a means of interrogating a parking fee device inside a vehicle by an attendant outside the vehicle.

Further, U.S. Pat. No. 5,635,693 discloses a means of identifying vehicles entering or leaving an area for security and marketing purposes. No means of linking the identity of the vehicle with the identity of the identifying unit, or any use of such linking is disclosed.

International patent application no. WO 01/25056 discloses a means of wireless transmission of data between the body of a vehicle and various elements of the vehicle such as sliding doors and seats. This communications is restricted to elements within a vehicle, and does not provide extra-vehicular communications.

None of the aforementioned disclosures address the location and association of a specific vehicle with a specific service terminal so that the system is prepared for coupling of the vehicle and the transfer of said physical resources or energy or data or any combination thereof and to ensure that only the specific service terminal is activated for coupling and transfer.

Further, U.S. Pat. No. 5,072,380 discloses a method of identifying vehicles entering a prescribed area to enable billing for purchases made while in the prescribed area. However, this patent does not cover the instance whereby automatic servicing can be effected, or the instance whereby a specific service terminal is identified with a specific vehicle. An object of the present invention is to establish communications between a service terminal and a vehicle moving towards that service terminal in order to prepare automatic service apparatus to be ready when the vehicle docks. A further object of the present invention is that these same communications are used to determine when the vehicle is in a couplable position.

Similarly, U.S. Pat. No. 6,026,868 discloses a system capable of differentiating between types of transponders, such as those carried on a person and those mounted on a vehicle. A purpose is to permit personal movement whilst limiting or preventing vehicle movement during manual fueling. In one embodiment of this latter disclosure, multiple antennas are used to locate and to determine movement of a transponder on a vehicle. However, neither of these two examples of this prior art covers the instance whereby automatic servicing can be effected, nor the instance whereby a specific service terminal is identified with a specific vehicle.

In a further example of the prior art, European patent application no. EP 1,038,830 discloses a fuel dispensing system for determining whether a vehicle is equipped with an on-board fuel vapor recovery system when manual fueling is used. In this prior art, vehicle location is typically determined through the use of multiple antennas dispersed at a fueling station, and triangulation means. It is an object of the present invention that a zone of proximity detection related to a service terminal be established by means of detection at that service terminal only. It is a further object of this present invention that the identification of both the service terminal and the vehicle be associated or combined for all subsequent processing.

In addition, U.S. Pat. No. 5,204,819 discloses a means of monitoring the fueling process of a stationary vehicle. This disclosure requires the operator to manually insert a fueling nozzle into a tank. A radio frequency (RF) pickup coil on the fueling nozzle then communicates with a similar coil on the tank. An object of the present invention is to establish communications between a service terminal and a vehicle moving towards that service terminal in order to prepare automatic service apparatus before the vehicle docks. A further object of this present invention is that the communications established are also employed to guide the vehicle to the correct position for coupling.

SUMMARY OF THE INVENTION

The present invention includes a system for identifying a vehicle that is within a specified distance from an automatic service terminal such that automatic coupling with the service terminal can be effected, as well as identification of the service terminal. Further, through the combining of the vehicle identification data with the service terminal identification data, and by further transmitting the combination of the vehicle identification data and the service terminal identification data to a service port controller or station controller, the service terminal can be enabled such that services can be initiated rapidly after coupling with the vehicle. It is an object of the present invention to enable automated vehicle docking within a suitable parked range. It is also an object of the present invention to enable continuous secure service transactions once a vehicle has docked.

In addition, in those embodiments incorporating multiple service terminals, the present invention includes a means of ensuring that no other service terminal on an energy exchange station can be enabled for coupling with the vehicle and that no other vehicle can be permitted to simultaneously couple with that service terminal.

The vehicle identification and orientation may be accomplished by means of a transponder that requires no external power source and that is interrogated by a transceiver, or by transceivers located at the service terminal and on the vehicle, which can interchange information one with the other. One of such transponders can be deployed in or on a vehicle whilst the transceiver or transceivers is deployed in, on or near a service terminal, or alternatively, one of such transponders can be deployed in, on or near a service terminal, whilst the transceiver or pair of transceivers is deployed in or on a vehicle.

In all cases covered by the present invention, the transceivers are located such that identification cannot be effected unless a vehicle is oriented according to the objects of the present invention with respect to a service terminal such that authorized coupling can occur.

One embodiment of the present invention includes a transponder deployed in or on a vehicle and a transceiver deployed in, on or near a service terminal. In this embodiment a vehicle operator selects or is directed to a service terminal to couple with and attempts to park the vehicle in a position that permits automated coupling to the service terminal. Once the vehicle is within a specified distance from the service terminal, attempts by the transceiver to interrogate the transponder are successful and the transceiver obtains the vehicle's identification code. In this embodiment the transponder and the transceiver may consist of a passive RFID tag and an active RFID reader or a passive optical marker and an active optical marker reader or a passive wireless transponder and an active wireless transceiver, or a bar code label and bar code reader.

Another embodiment of the present invention includes a transponder deployed in, on or near a service terminal and a transceiver deployed in or on a vehicle. In this embodiment, a vehicle operator selects or is directed to a service terminal to couple with and attempts to park the vehicle in a position that permits automated coupling to the service terminal. Once the vehicle is within a specified distance from the service terminal, attempts by the transceiver to interrogate the transponder are successful and the transceiver obtains the service terminals identification code. In this embodiment, the transponder and transceiver may consist of a passive RFID tag and an active RFID reader or a passive optical marker and an active optical marker reader, or a passive wireless transponder and an active wireless transceiver, or a bar code label and bar code reader. Also in this embodiment a wireless transceiver is located on the vehicle to provide communications between the vehicle and a wireless transceiver located at the service terminals or energy exchange station.

A further embodiment of the present invention includes a first wireless transceiver deployed in, on or near a service terminal and a second wireless transceiver deployed in or on a vehicle. In this embodiment a vehicle operator selects or is directed to a service terminal to couple with and attempts to park the vehicle in a position that permits automated coupling to the service terminal. Once the vehicle is within a specified distance from the service terminal, the first and second wireless transceivers establish inter-communications and transmit and receive data including, but not restricted to, the vehicle's identification code. In this embodiment the effective radiated power of the transmitter or the beam width of the transmitter or the sensitivity of the receiver or the beam width of the receiver or any combination thereof is arranged so as to not cause interference to or receive interference from other service terminals or from vehicles attempting to couple with other service terminals. This embodiment includes an option whereby a third wireless transceiver mounted in or on the vehicle can communicate directly with a stationary wireless transceiver located at the service terminal or energy exchange station. In those embodiments incorporating multiple ports, the service terminals may be physically deployed adjacent one to the other. Sets of adjacent service terminals may be located on either side of a central median. Any number of vehicles may couple with service terminals simultaneously up to and including the total number of service terminals on an energy exchange station. Also, a vehicle identifier may include further identification data related to which class of a group of classes the vehicle belongs. These classes may consist of any categories to which vehicles may be assigned, and may relate to type or configuration of service terminal associated with that class of vehicles.

Irrespective of the particular embodiment, a vehicle identification code combined with associated service terminal identification code is passed to a service port controller or a station controller. Such controllers are so configured such that only the selected service terminal can be associated with the vehicle identification code. The controller then sends the pre-defined control signals to the selected service terminal to configure the service terminal for coupling with the vehicle.

Further, the vehicle identification code may include a vehicle identification number as is commonly understood. Alternatively, a non-unique identification number that identifies the vehicle as suitable for coupling may be used, in combination with a second unique identification number, communicated through vehicle wireless communications.

DETAILED DESCRIPTION OF THE DRAWINGS

The present invention will be further understood from the following detailed description with reference to the drawings in which.

DETAILED DESCRIPTION OF THE INVENTION

The invention relates to an energy exchange system that provides services to vehicles docked at service terminals. Such service terminals may consist of individual ports, intended for private or home use, or a multiplicity of such ports as may be deployed at a publicly accessed station.

An energy exchange system as described includes a service terminal for coupling vehicles to exchange energy services, the terminal including vehicle coupling hardware and connection to energy service provider systems, and an energy exchange network governing the control and management of energy exchange between the connected systems.

Figure 1:
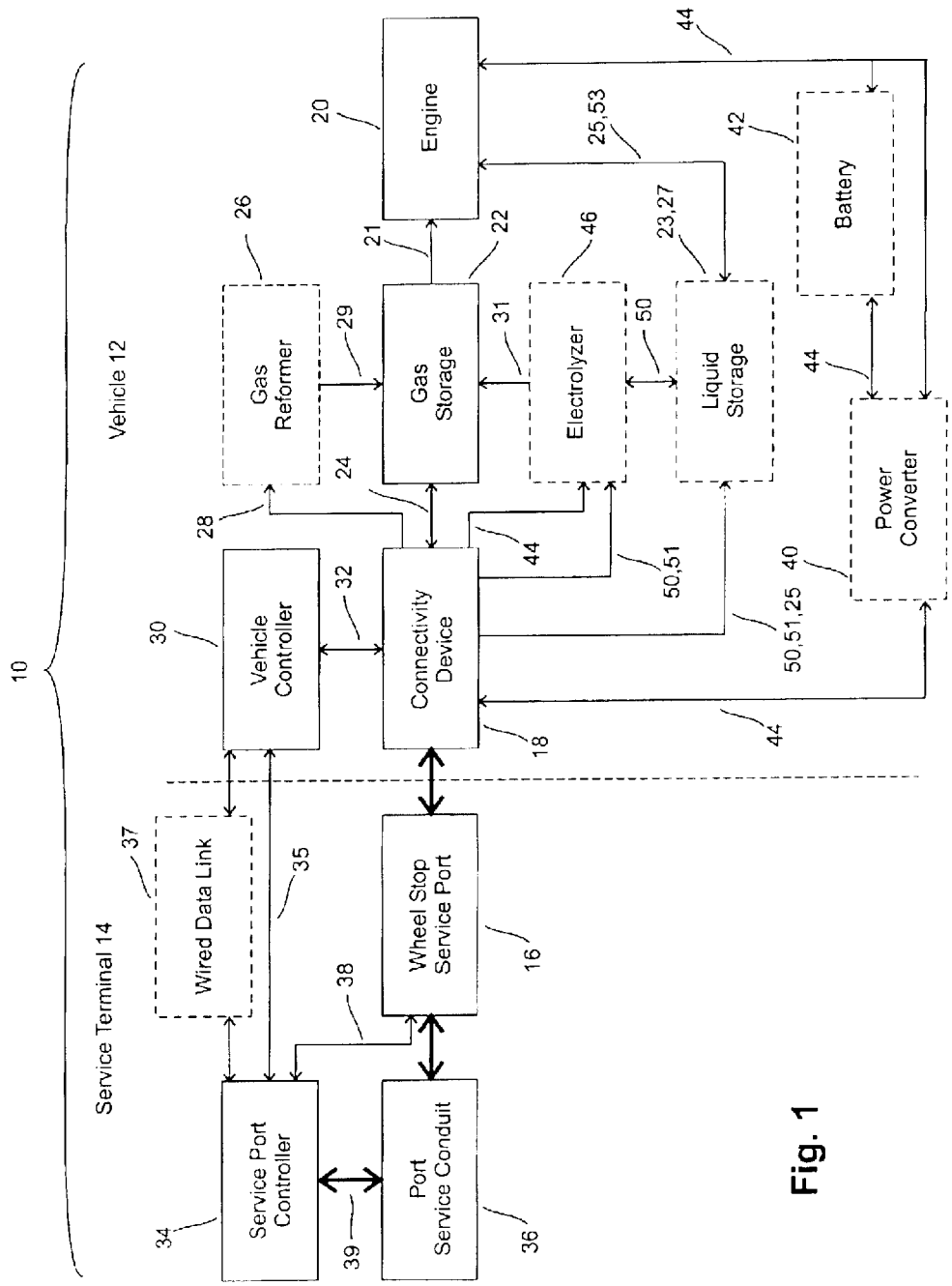
FIG. 1 illustrates in a system block diagram, a service terminal and a terminal-compatible vehicle, wherein liquid and gaseous fuels, water, electricity and data are exchangeable between the terminal and the vehicle.

FIG. 1 illustrates an embodiment of a system 10 for transferring one or more of energy, material or data (collectivity referred to as "services") between system-compatible vehicles 12 and a stationary service terminal 14. The service terminal 14 may be integrated into a building or pre-existing structure, or be part of a dedicated vehicle service terminal facility or be part of a mobile vehicle service port. In each embodiment, the service terminal 14 has a wheel stop service port 16 and the vehicle 12 has a connectivity device 18 that can couple to the wheel stop service port 16. Other major components of the service terminal 14 include a service port controller 34 for controlling the transfer of services by the wheel stop service port 16, and a port service conduit 36 for coupling the service terminal to one or more service destinations (not shown). The destination may be a service source when the service is to be transferred from the source to the vehicle 12; for example, the service source may be a fuel tank that supplies fuel to the vehicle when coupled to the service terminal 14. Or, the destination may be a service consumer when the service is to be transferred from the vehicle 12 to the consumer; for example, the service terminal 14 may be connected to a power grid, and the consumer may be an electricity user connected to the grid that receives electricity generated by a fuel cell onboard the vehicle and transferred to the grid when the vehicle is connected to the service terminal.

The system 10 is particularly suitable for providing services to fuel cell and regenerative fuel cell vehicles, but can also serve vehicles powered by other means, such as natural gas, liquid fuels, electricity, etc. The vehicle 12 has a number of components that make it compatible with the service terminal 14; the type of components depend on what services are being transferred.

FIG. 1 illustrates an embodiment of a system 10 that is capable of transferring one or more of gaseous and liquid fuel, water, electrical energy and data between a service terminal 14 and a vehicle 12. The vehicle 12 may include some or all of the components as described in the systems illustrated in FIG. 1. The connectivity device 18 may include one or a combination of the service connections as described below. The wheel stop service port 16 has interfaces for at least gaseous fuel, liquid, electricity and data. The wheel stop service port 16 is suitable to work with the connectivity device 18 of any vehicle, regardless of the maximum number of service connections on the connectivity device 18. An additional function of the system 10 is that the type of connectivity device 18 and the type of service required is determined by communication between the vehicle controller 30 and the service port controller 34. The service port controller 34 provides control signals through the control signal wire 38 to the wheel stop service port 16 directly, or via control signal wire 39 and port service conduit 36 to control the transfer of only those services suitable for the identified connectivity device 18.

The connectivity device 18 is electrically communicative with a vehicle controller 30 via control signal wire 32, which controls operation of the connectivity device 18; for example, the vehicle controller 30 provides automatic connection and gas transfer control signals to control the transfer of gaseous fuel through the connectivity device 18. The vehicle controller 30 has a transceiver (not shown) to exchange data wirelessly with a transceiver (not shown) in a service port controller 34 of the service terminal 14 (wireless link shown as 35). The construction of the controllers 30, 34 are known in the art. Optionally, a wired data link 37 may be substituted for the transceivers; in such case, data line connection points (not shown) are provided on each of the wheel stop service port 16 and the connectivity device 18 that connect when the wheel stop service port 16 and the connectivity device 18 are coupled or alternatively data can be sent over the electrical power connections. The data communicated to and from the vehicle controller 30 relates to providing data-related services that include vehicle identification, and fueling processes.

The connectivity device 18 has a gas transfer port (not shown) that is sealably connectable to a gas transfer port (not shown) of the wheel stop service port 16 to enable the transfer of gas between the vehicle 12 and the service terminal 14. The connectivity device 18 is connected to a gas storage cylinder 22 by way of gas line 24. Gas line 24 is bi-directional to enable fuel to be transmitted from the service terminal 14 to the vehicle 12, or vice versa. The gas storage cylinder 22 is fluidly connected to the engine 20 by way of gas transfer line 21. In one embodiment, gaseous fuel is transferred and reformed so that constituents such as hydrogen gas can be stored on-board the vehicle. A gas reformer 26 is provided that is connected to the connectivity device 18 via gas line 28, and connected to the gas storage cylinder 22 via gas line 29, so that gaseous fuel transmitted from the wheel stop service port 16 can be first reformed before being stored in the gas storage cylinder 22 and used by the engine 20.

An embodiment of the service terminal is to provide the function of electricity transfer to or from the vehicle, for the purposes of powering onboard electrolysis or storage charging, and for transferring generated electricity from the vehicle back through the service terminal. In this case, the connectivity device 18 is configured to transmit electric power between the service terminal 14 and the vehicle 12, and the vehicle controller 30 is configured to control the transmission of electrical energy by the connectivity device 18. Electrical cables 44 electrically couple the connectivity device 18, power converter 40, battery 42, and the engine 20. Similarly, the wheel stop service port 16 is configured to transmit electric power between the service terminal 14 and the vehicle 12, and the service port controller 34 is configured to control the transmission of energy by the wheel stop service port 16.

A potential use of the service terminal is to transfer liquid fuel such as gasoline. The connectivity device 18 is configured to transfer liquid fuel between the service terminal 14 and the vehicle 12, and the vehicle controller 30 is configured to control the transmission of liquid by the connectivity device 18. Similarly, the wheel stop service port 16 is configured to transmit liquid fuel between the service terminal 14 and the vehicle 12, and the service port controller 34 is configured to control the transmission of liquid fuel by the wheel stop service port 16. A liquid fuel storage tank 23 and liquid fuel lines 25 are designed to store and transmit liquid fuel as known in the art.

Figure 2:
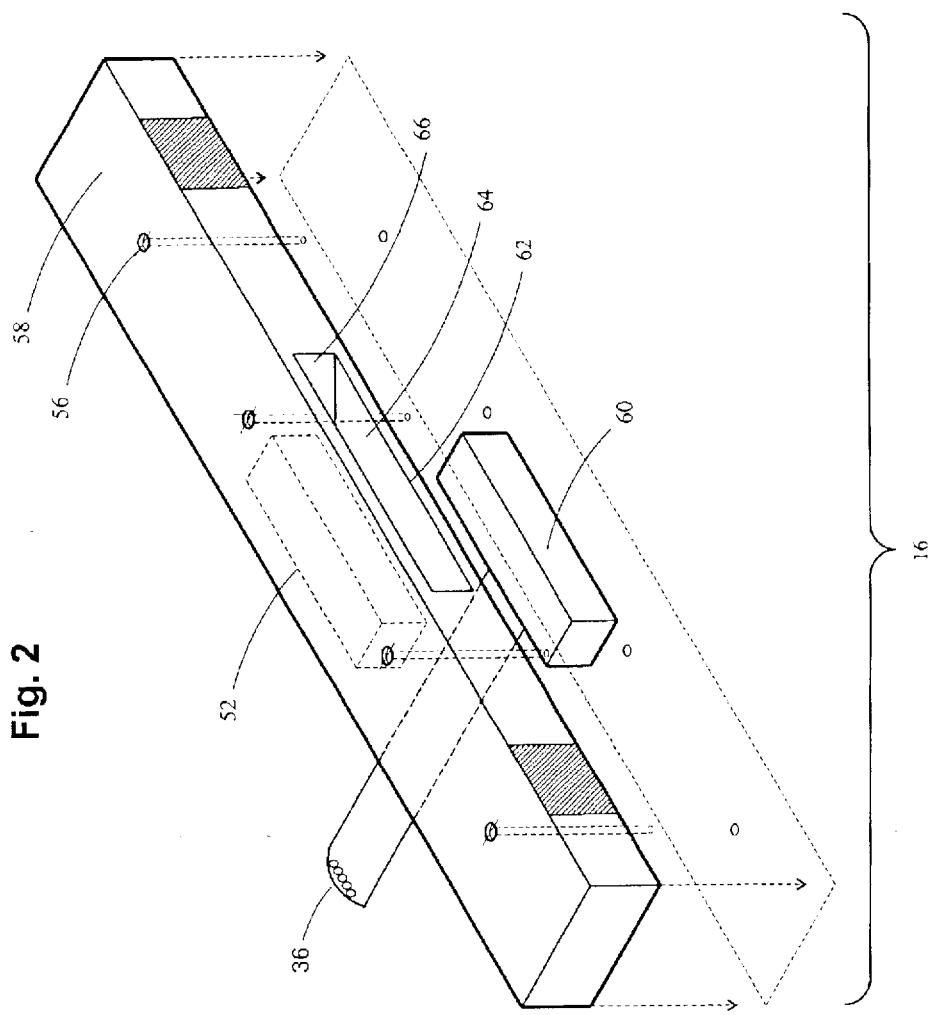
FIG. 2 illustrates in a perspective view, a wheel stop service port of the service terminal in FIG. 1.

The service terminal, in an embodiment, may transfer water or other liquids to the vehicle for onboard electrolysis for hydrogen generation. A fluid storage tank 27 is provided to store water transferred from the service terminal 14, an electrolyzer 46 is provided to electrolyze the water to produce hydrogen gas, and a gas storage cylinder 22 is provided to store the hydrogen gas for use by the engine 20. Hydrogen fuel lines 21, 31 fluidly connect the gas storage cylinder 22 to the electrolyzer 46 and engine 20 respectively, and fluid supply and return lines 50, 51 fluidly connect the fluid storage tank 27 to the connectivity device 18 and the electrolyzer 46 respectively. Water is supplied to the vehicle 12 as hydrogen feedstock for the electrolyzer 46 via liquid supply line 50, and unused water from the electrolyzer 46 is returned through liquid return line 51. Water line 53 connects the fluid storage tank 27 to the engine 20 to return product water from the engine 20 and to supply water to humidify the gas stream. Both the connectivity device 18 and the wheel stop service port 16 are configured to transfer liquid and electricity between the service terminal 14 and the vehicle 12. Electrical cables 44 electrically connect the connectivity device 18 to the electrolyzer 46. The vehicle controller 30 is configured to control the operation of the connectivity device 18 to transfer water and electricity for the operation of the electrolyzer 46. The electrolyzer 46 is fluidly connected to the gas storage cylinder 22 through gas line 31. Referring to FIG. 2, the wheel stop service port 16 serves as a ground-mounted stationary docking location for vehicles 12 equipped with compatible connectivity devices 18. Such vehicles 12 couple to the wheel stop service port 16 and bi-directionally transfer services between the service terminal 14 and the vehicle 12. As mentioned, these services include electrical power, gaseous or liquid fuels, water or data. The wheel stop service port 16 is also designed to prevent the wheels of the vehicle 12 from traveling beyond a specific point in a parking stall and to locate the vehicle 12 in a position that places the vehicle's connectivity device 18 in a position for coupling to the service port 16. Other forms of service ports 16 may be used in the overall energy exchange network, including manual connections from service ports.

The wheel stop service port 16 has a generally elongate rectangular wheel stop housing 58 with fastening holes 56. The fastening holes receive a fastener (not shown) for fastening the service port 16 to a parking surface. Near the center of the front surface of the housing 58 is a recess opening 62 that opens into a receptacle recess 52. A connection bay 64 and a receptacle 60 are mounted inside the receptacle recess 52. The connection bay 64 has a front opening in the shape of a rectangular slot, and has tapered walls 66 that taper inwards both vertically and horizontally into the receptacle 60. The front opening of the connection bay 64 is flush with the recess opening 62. The receptacle 60 is mounted inside the receptacle recess 52 behind the connection bay 64 and also has tapered walls (not shown) that taper into the back wall of the receptacle. As discussed in detail below, the tapered walls 66 serve to guide a service plug 70 from the vehicle's connectivity device 18 into a coupling position inside the receptacle 60, i.e., into a position where the plug contacts the back wall of the receptacle.

In this description, the receptacle 60 and plug 70 are collectively referred to as a "service coupling". Furthermore, the connection bay 64 and receptacle 60 are collectively referred to as the "connection bay assembly".

The tapered walls 66 act to guide, or "self-locate" the plug 70 into a coupling position, thereby removing the need to provide costly electronic coupling guidance systems. It is understood that other self-locating designs such as a funnel may be substituted for the tapered walls 66 as will occur to one skilled in the art.

The service port 16 is externally controlled by the service port controller 34 via a signal conduit housed inside the service conduit 36. An externally controlled receptacle 60 allows system intelligence such as the service port controller 34 to be located elsewhere, enabling the service port 16 to be economically and easily replaced. Optionally, the service port 16 also has a port status indicator (not shown) located on the top surface of the housing 58.

The recess opening 62 is located on the front wall of the service port 16 but it may be located anywhere on the wheel stop housing 58. For example, the recess opening 62 may open from the top surface of the housing 58 such that the receptacle 60 and connection bay 64 receive a vertically deployed connectivity device 18.

The receptacle 60 is provided with service exchange interfaces that mate with corresponding service exchange interfaces on the plug 70 to effect a transfer of services therebetween. The service conduit 36 is coupled to the receptacle 60 at the back of the service port 16 and to service sources and/or destinations, thereby enabling the services to be transferred to and from the service port 14 and the service source/destination.

In an alternative embodiment, the service terminal 14 does not include the wheel stop service port 16 and in such case, a service port comprising the connection bay 64 and receptacle 60 are located elsewhere on the service terminal, and the corresponding location of the connectivity device 18 on the vehicle 12 of the alternative embodiment is at a position for coupling to the service port 16.

Figure 3:
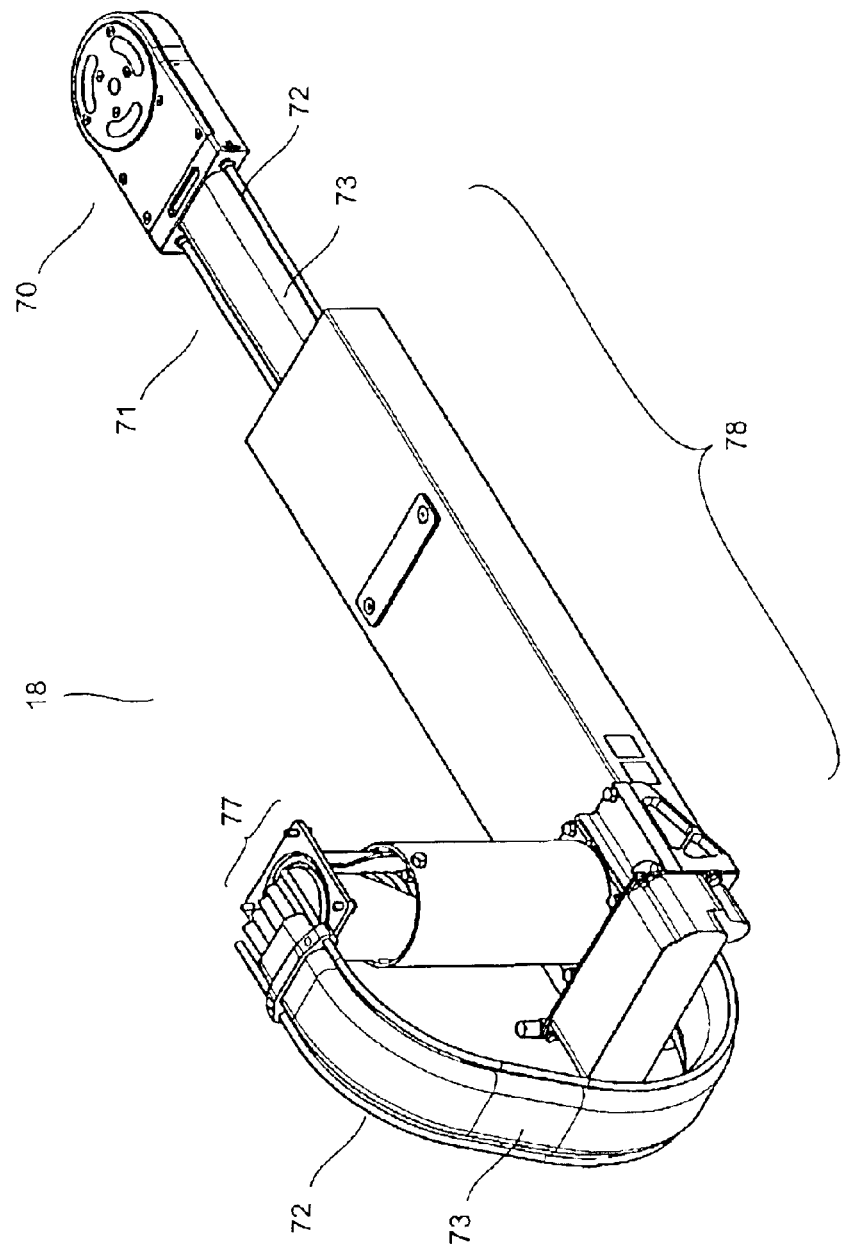
FIG. 3 illustrates in a perspective view, a connectivity device mountable to a vehicle.

Referring to FIG. 3, the connectivity device 18 is for connecting the vehicle 12 to the service terminal 14 such that services can be exchanged therebetween. In this first embodiment, the connectivity device 18 is mountable to the front underside of the vehicle 12, has means to deploy the connectivity device from the vehicle, and has plug structures to couple to the receptacle 60 on the wheel stop service port 16 when the vehicle is in close proximity to the wheel stop service port. However, it is within the scope of the invention to mount the connectivity device 18 to a different part of the vehicle 12, or to mount the receptacle 60 to a different part of the service terminal 14. It is also within the scope of the invention to locate the connectivity device 18 on the wheel stop service port 16, and locate the receptacle 60 on the vehicle 12; in such case, the connectivity device extends from the wheel stop service port to couple to the vehicle when the vehicle is in close proximity to the wheel stop service port.

The major components of the connectivity device 18 are a plug 70 for coupling to the receptacle 60 of the service terminal 14, a compliant member 71 attached at one end to the plug, a deployment apparatus 78 attached to the compliant member for deploying the plug from a stored position into a deployed position and retracting same back into the stored position, and a vehicle mounting assembly 77 attached to the deployment apparatus 78 and mountable to the underside of the vehicle 12.

The compliant member 71 comprises a pair of flexible water lines 72 and flexible electrical cables 73 having a plurality of flexible electrical power conductors (not shown) housed within a protective jacket. The water lines 72 and the power conductors are coupled to components of the vehicle 12 that use or supply water and/or electricity. For example, the water lines 72 and electrical cables 73 may be connected to the on-board electrolyzer 46 to supply feedstock water and power the electrolyzer 46, respectively. Another option is that a hydrogen supply line is provided (not shown) for the purpose of direct fueling of the vehicle from a stored source of hydrogen.

In operation, the service coupling is engaged whenever the vehicle parks at a service port 16. The vehicle is typically parked at a service port 16 for fueling although it may also be parked to enable the transfer of information from or to the service port controller 34 and network controller (not shown in the figures). The connectivity device 18 is inserted into the receptacle 60 and is physically clamped in place by the clamp actuator (not shown) in the wheel stop service port 16. Typically the wheel stop service port 16 is fixed to the ground or parking structure and receives power from a fixed line. Thus the wheel stop service port 16 is able to physically fix the vehicle 12 in place independent of the vehicle power supply or vehicle engine systems. The docking process allows only an authorized user to unlock the docking mechanism. User authorization may be determined using a variety of techniques, such as: user identification and password; card and personal identification number (PIN); or biometric scan.

In one form of the invention the wheel stop service port 16 is installed at the vehicle owner's residence such that the vehicle can be fueled overnight or can generate power while parked at a private residence.

Figure 4:
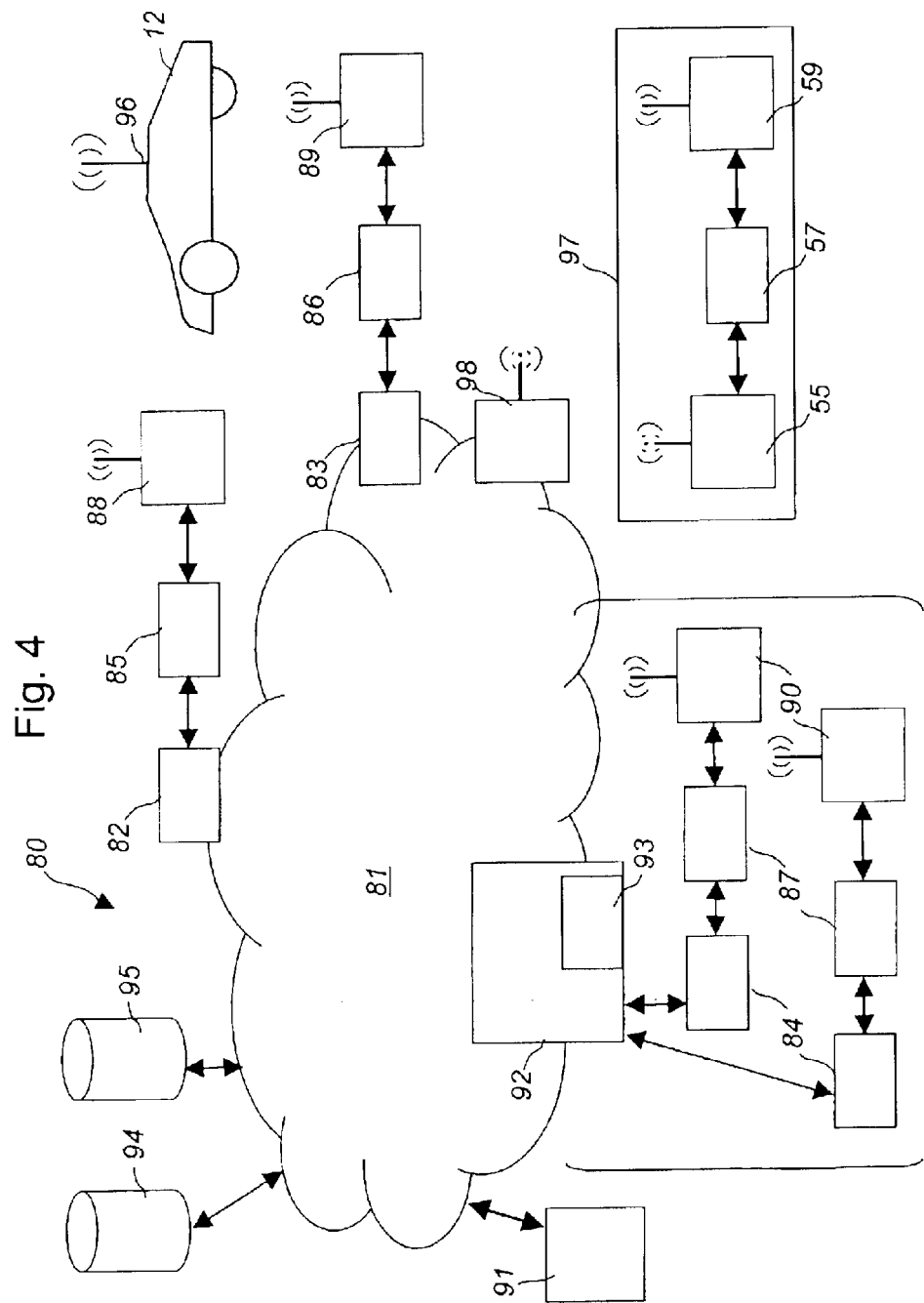
FIG. 4 illustrates an energy exchange network including a coupling system.

Referring to FIG. 4, there is illustrated an energy exchange network 80 including a coupling system in accordance with an embodiment of the present invention. The coupling systems are located at network nodes corresponding to service terminals 14 that include service port subsystems for communicating and coupling to vehicles 12 accessible to the network. An energy exchange station node controller 92 is located at energy exchange stations (not shown). An energy exchange station controls and manages multiple service ports 16 and coordinates network communications with individual service node controllers 82, 83, 84 at the service port. The station node controller 92 controls access to energy services and are connected to a plurality of service terminals 14 and enable management of local energy and services by the service terminals at that energy exchange station. An energy exchange network 80 includes a plurality of energy exchange network servers 91, a plurality of service node controllers 82, 83, 84, each coupled to an energy exchange network server via the wide area network 81. The wide area network 81 may include combinations of a private or public network, and technologies such as wireless, dialup, wired, satellite, broadband or internet systems. Service node controllers 82, 83 and 84 are coupled to access controllers 85, 86, 87, which in turn are coupled via node transceivers 88, 89, 90 to vehicles 12 provided with a corresponding communications transponder 96 or transponders 96. The access controllers 85, 86, 87 restrict services of their respective service node controllers 82, 83, 84 according to authorizations associated with potential users, such as a user corresponding to node transponder 96.

Each node transceiver 88, 89, 90 establishes a wireless local area network (LAN). Each node may be serviced by a single wireless LAN as illustrated in FIG. 4, or may have multiple wireless transceivers establishing multiple wireless LAN's.

The energy exchange station node controller 92 is communicable with the service node controllers 84 associated with service terminals 14 located at the energy exchange station (not shown) and may control services provided through the associated service terminals, as well as local energy storage and distribution. In this example, the station node controller 92 communicates directly with the wide area network 81, and the service node controllers 82, 83, 84 communicate requests to the network through the station node controller. The station node controller 92 or individual service node controllers 82, 83, 84 may have a local cache 93 for storing authorization data and profiles, to enable services even when there is no connection to the network 81. The local cache 93 may include a database.

In either case, access to service node controllers 82, 83, 84 or via the wireless LAN is restricted by access controllers 85, 86, 87. Once the user corresponding to transponder 96 has docked the vehicle 12, a physical connection can optionally be established to support a data link between the access controller 85, 86, 87 and the transponder, consequently at least some of the ports can be accessed through a wired port in the vehicle coupling.

The energy exchange network server 91 provides energy services and management of distributed energy exchange transactions, manages transactions with energy service providers 94 and 95 (ESP) including buy and sell orders, and manages the energy exchange network 80 and service node controllers 82, 83, 84. Typically, a plurality of energy exchange network servers 91 is connected to the wide area network 81 to maintain a large scale of users and transactions. Data related to energy service providers 94 and 95 may be accessed via the energy exchange network 80 and the wide area network 81 and used to control buying and selling energy between the networked subsystems of the energy exchange network. An energy exchange network server 91 may include access to databases (not shown) for vehicle and user authentication and transaction data.

Users of the energy exchange network 80 may access the network through any of the energy exchange nodes or energy exchange network connections and may include ESP's, service providers, owners of service ports, vehicle owners and network managers.

In another embodiment, a mobile service node controller 55, similar in function to the above described stationary energy exchange service nodes, may be located in a mobile service port 97 to provide networked energy services. The function of the mobile service port 97 is to provide energy exchange, roadside support, fleet fueling, defueling, and emergency services to vehicles or other devices that require such services distant from a stationary energy exchange service system. In this embodiment, the wide area network 81 includes a second wireless network for mobile communications 98, which communicates wirelessly with the mobile service port 97 by way of a wireless connection with a mobile service node controller 55. The wireless connection between the network for mobile communications 98 and the mobile service node controller 55 is effected by commonly available mobile communications including cellular or satellite networks. The mobile service node controller 55 is in turn coupled to a mobile access controller 57, which in turn is coupled via mobile node transceiver 59 to vehicles 12 provided with corresponding communications transponder 96 or transponders 96. The mobile service port 97 includes an automated service port 16, and optionally a service port with manual connection.

Figure 5:
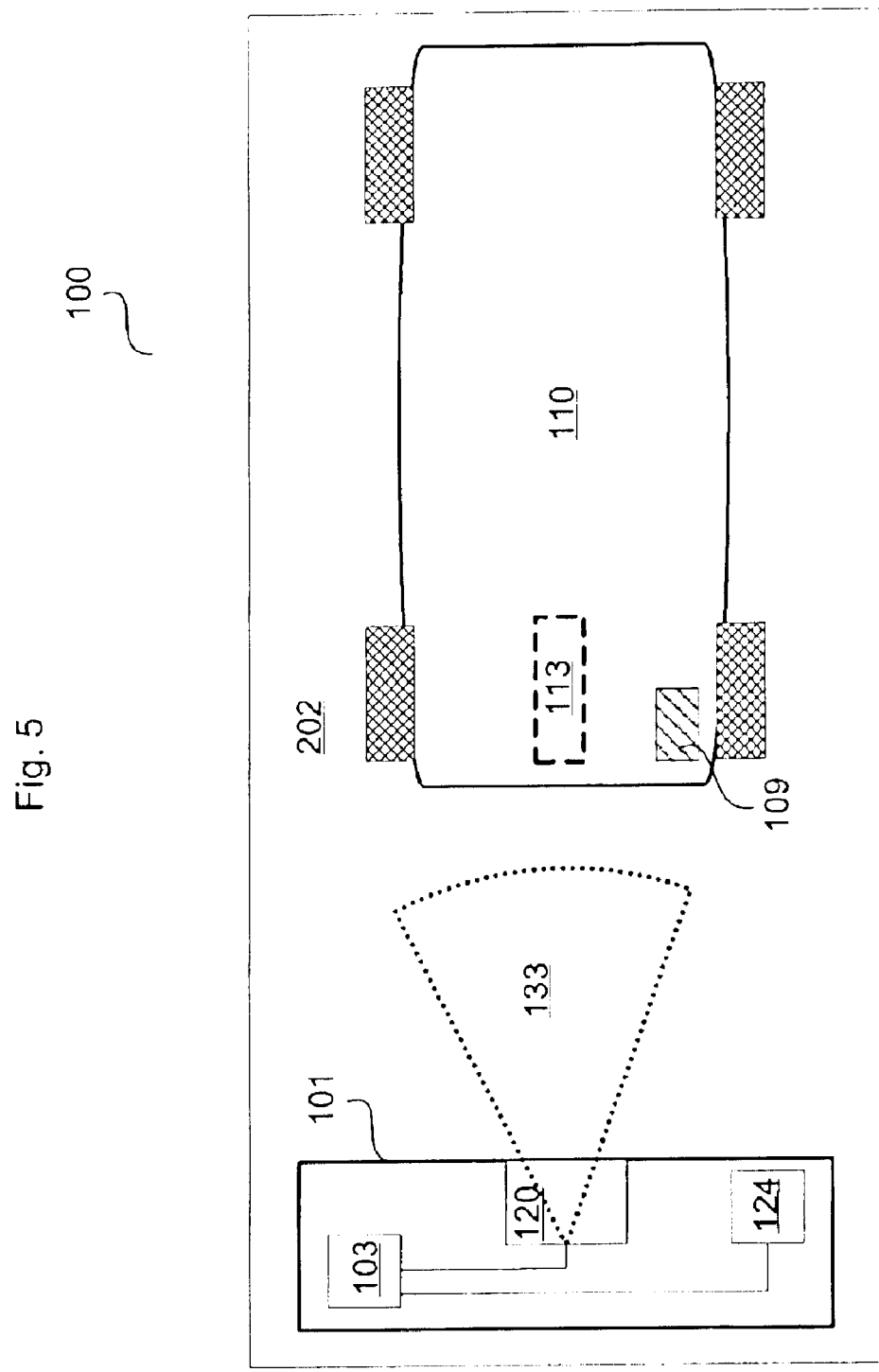
FIG. 5 is a pictorial view of a vehicle within a service stall showing a service terminal and its components.
Figure 18:
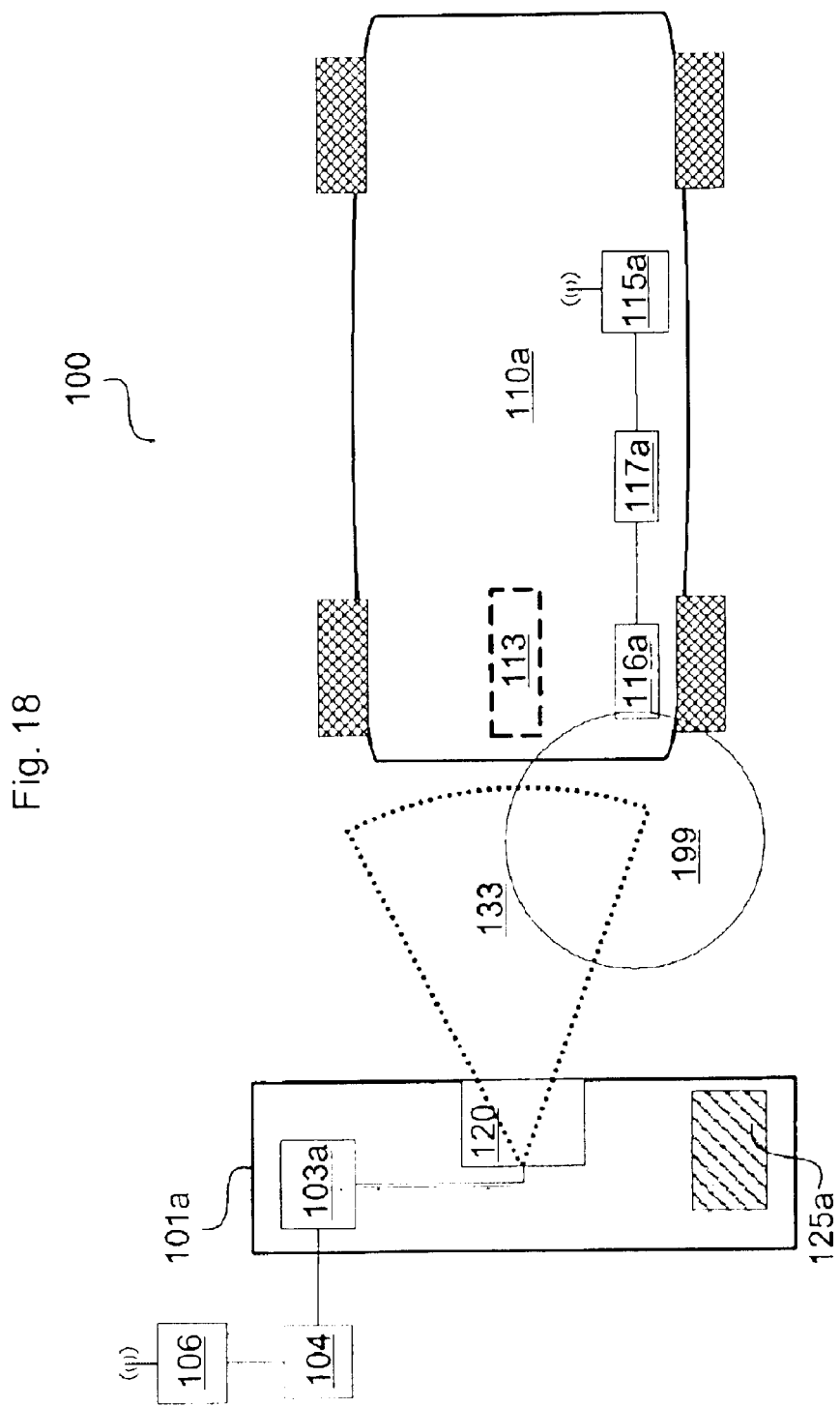
FIG. 18 illustrates a transceiver-equipped vehicle approaching a single transponder-equipped service terminal, in which the vehicle has a second transceiver for communication with a transceiver-equipped service port controller.

With reference to FIG. 5, an individual private or home use service terminal 101 is seen to be located within a service stall 202 and contains a service port 120 for the purpose of supplying services to vehicles 110 that are couplable with the service port. The service stall 202 may be a parking stall, a garage, or curbside location or similar fixed vehicle location. A service port controller 103, connected to the service port 120, is used for the overall monitoring and control of the service terminal 101. The service port controller 103 accesses and/or stores information on the vehicles 110 authorized to couple to the service terminal 101. The service port controller 103 also has network access to vehicle and energy exchange databases (not shown). The features and functions of the service port controller 103 and the service terminal 101 are not restricted to those contained in this disclosure and will be obvious to those skilled in the art. A station transceiver 106 (shown in FIG. 18) and a secure wireless access controller 104 (shown in FIG. 18) may also be connected to the service port controller 103 and co-located with the service port controller. Sensing apparatus, such as a wireless transceiver 124, may also be located at the service terminal 101. A couplable vehicle 110 according to the objects of this invention is also shown in FIG. 5. Said couplable vehicle 110 includes sensing apparatus, such as, but not limited to, a wireless transponder 109. Also, the service terminal 101 is capable of bi-directional transfer of services through the service port 120. The connection from the service port 120 to the vehicle 110 is typically automated such that no manual intervention is required to dock and connect the vehicle 110 to the service port 120. Alternatively, the energy exchange system 100 may be used with a semi-manual connection (not shown). The connection between the vehicle 110 and the service port 120 is by means of a connectivity device 113 coupled to a service receptacle 60, both of which must be within a relatively close range, defined as the coupling range 133 for automatic docking once the vehicle 110 is parked, this range being defined as the couplable range. Either the connectivity device 113 or the service receptacle 60 may be located on either the vehicle 110 or the service terminal 101 to enable automatic docking and interconnection. In the following overall description of operation, the service receptacle 60 is shown located at the service port 120 and the connectivity device 113 is shown on the vehicle 110. These may be interchanged with no loss of generality. The detection and communications systems of this invention are necessary for accurate and secure coupling with limited actions required from the vehicle operator. The following explanation commences with a general description of the operation of the communications system for the case of a single service terminal 101, typical of private or home installations, followed by a number of specific embodiments.

The overall operation of the energy exchange system 100 that is the subject of the present invention can be understood by reference to FIGS. 2, 3, and 5 to 9. In these figures, three vehicles 110a, 110b, and 110c have been depicted in a consistent manner, in order to illustrate the different locations of a single vehicle equipped for monitored coupling to a service terminal 101. Likewise, the service terminals associated with the three vehicles 110a, 110b, and 110c have been designated as 101a, 101b, and 101c, respectively. Likewise, the service port controllers have been designated as 103a, 103b and 103c. Likewise, the wireless transceivers have been designated as 124a, 124b and 124c. Likewise, the wireless transponders 109 have been designated 109a, 109b and 109c. Likewise in FIGS. 10 to 24, wireless transceivers 115, 116, 126, 131, 132, 118, wireless transponders 114, 125 and access controllers 117 have been designated as "a", "b" and "c".

A vehicle 110a, b, or c equipped according to the objects of this invention includes a vehicle identification code 119 (shown in FIG. 9) This vehicle identification code 119 can be a unique number, originated solely for the purpose of implementing the objects of this invention. The vehicle identification code 119 can also include the vehicle identification number (VIN), which is an industry standard means of identifying an individual vehicle. Further, this vehicle identification code 119 can be extended to identify which class of a group of classes the vehicle 110 belongs to. These classes may consist of any category to which vehicles 110 may be assigned, and may relate to type or configuration of service terminal 101 associated with that class of vehicles.

Figure 6:
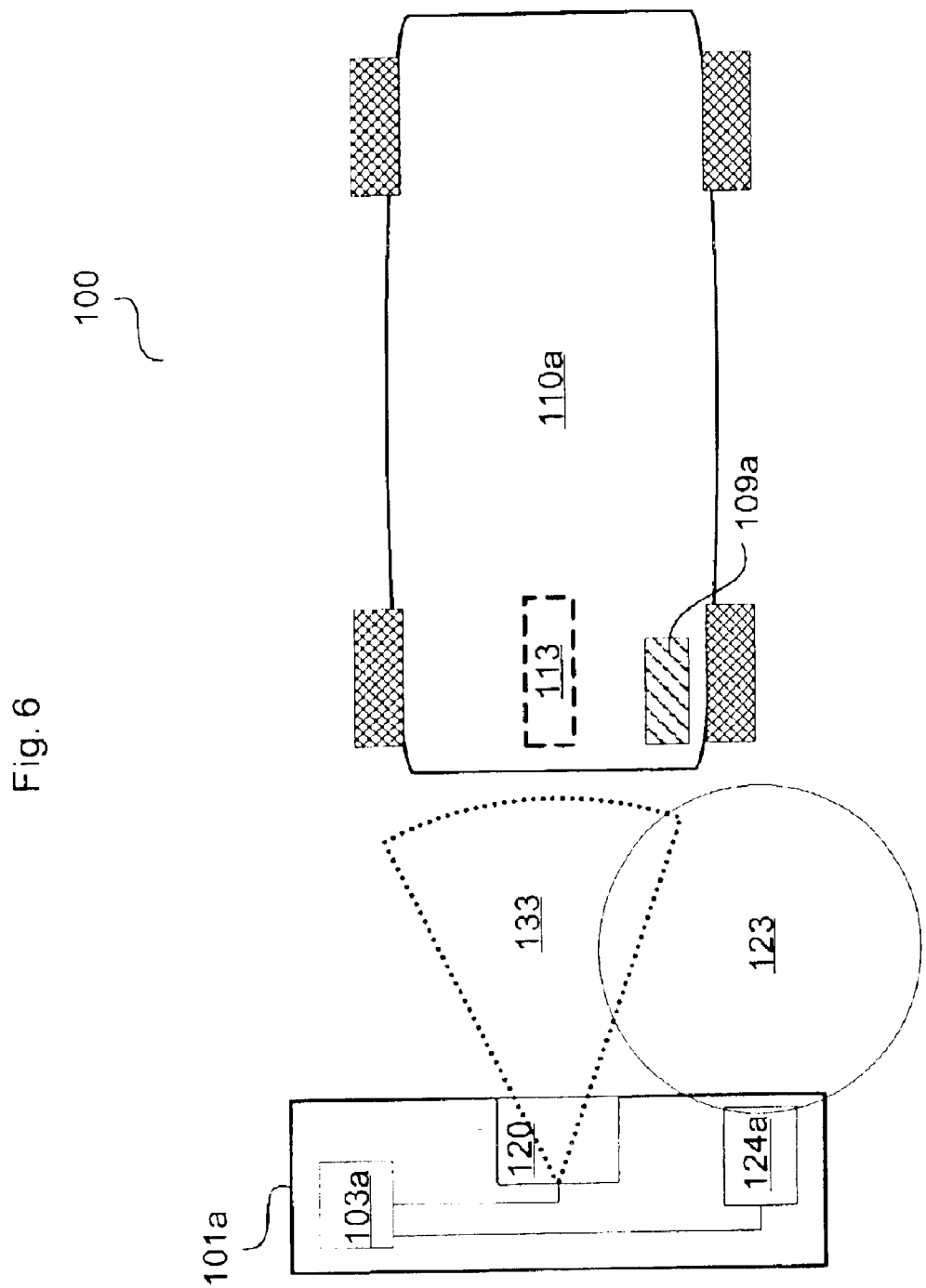
FIG. 6 illustrates a vehicle approaching a service terminal.

FIG. 6 depicts a vehicle 110a equipped for service terminal docking, approaching a service terminal 101a that is equipped with a service port 120. In this embodiment, the vehicle 110a has a wireless transponder 109a such as a radio frequency identification (RFID) tag, and the service terminal 101a has a wireless transceiver 124a. When the vehicle 110a arrives within a specified distance of the service terminal 101a, the vehicle and the service terminal are able to communicate one with the other, by way of said transceiver 124a and transponder 109a and the vehicle is defined as being within the zone of proximity detection 123. A typical zone of proximity detection range is of the order of 50 cm to the front of the wireless transceiver 124a. Thus, in this case depicted in the figure, the vehicle 110a is outside of the zone of proximity detection 123 and the presence of the vehicle is not detected by the sensing and control apparatus at the service terminal 101a.

Figure 7:
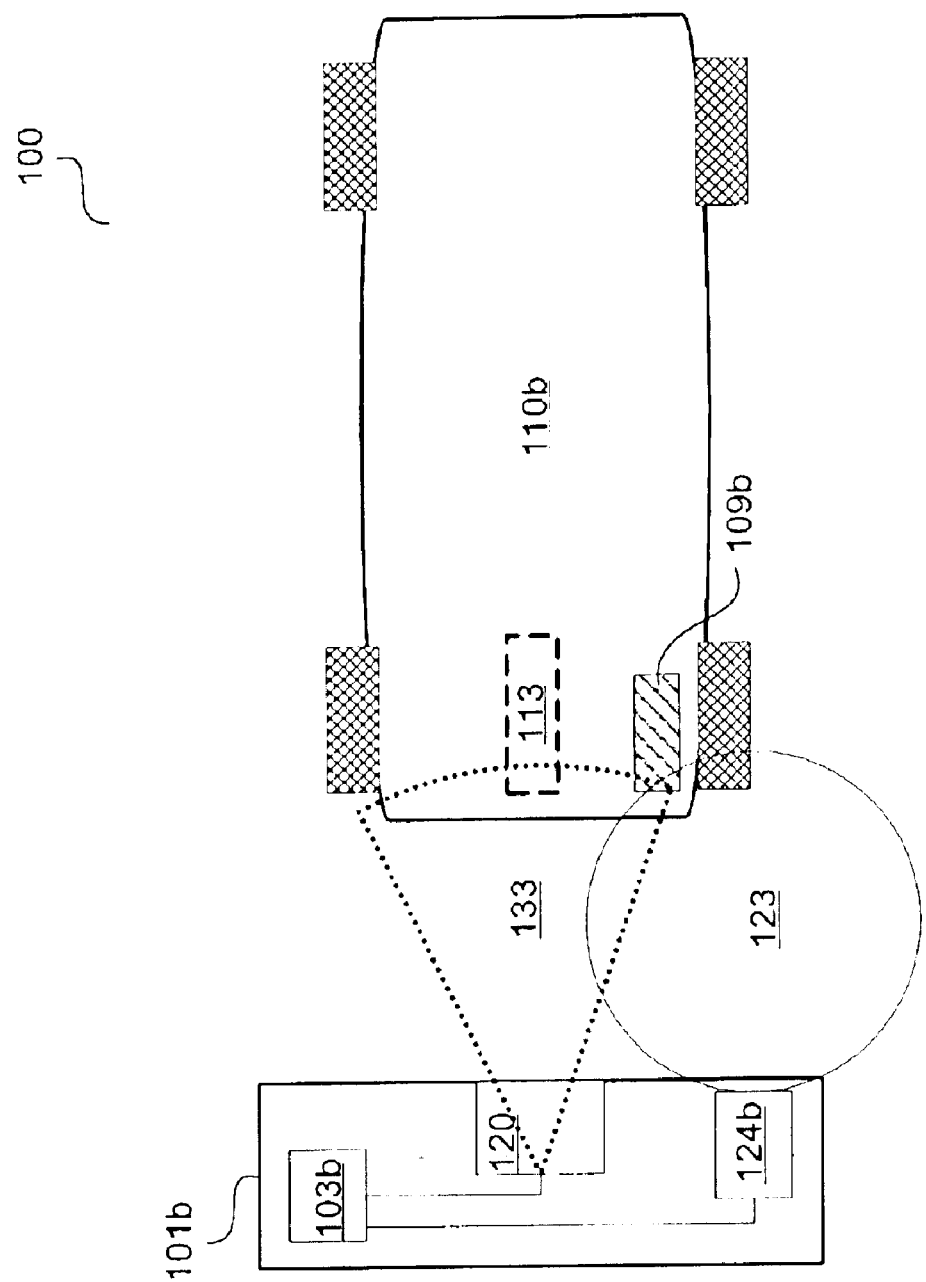
FIG. 7 illustrates a vehicle within the zone of proximity detection of a service terminal.
Figure 9:
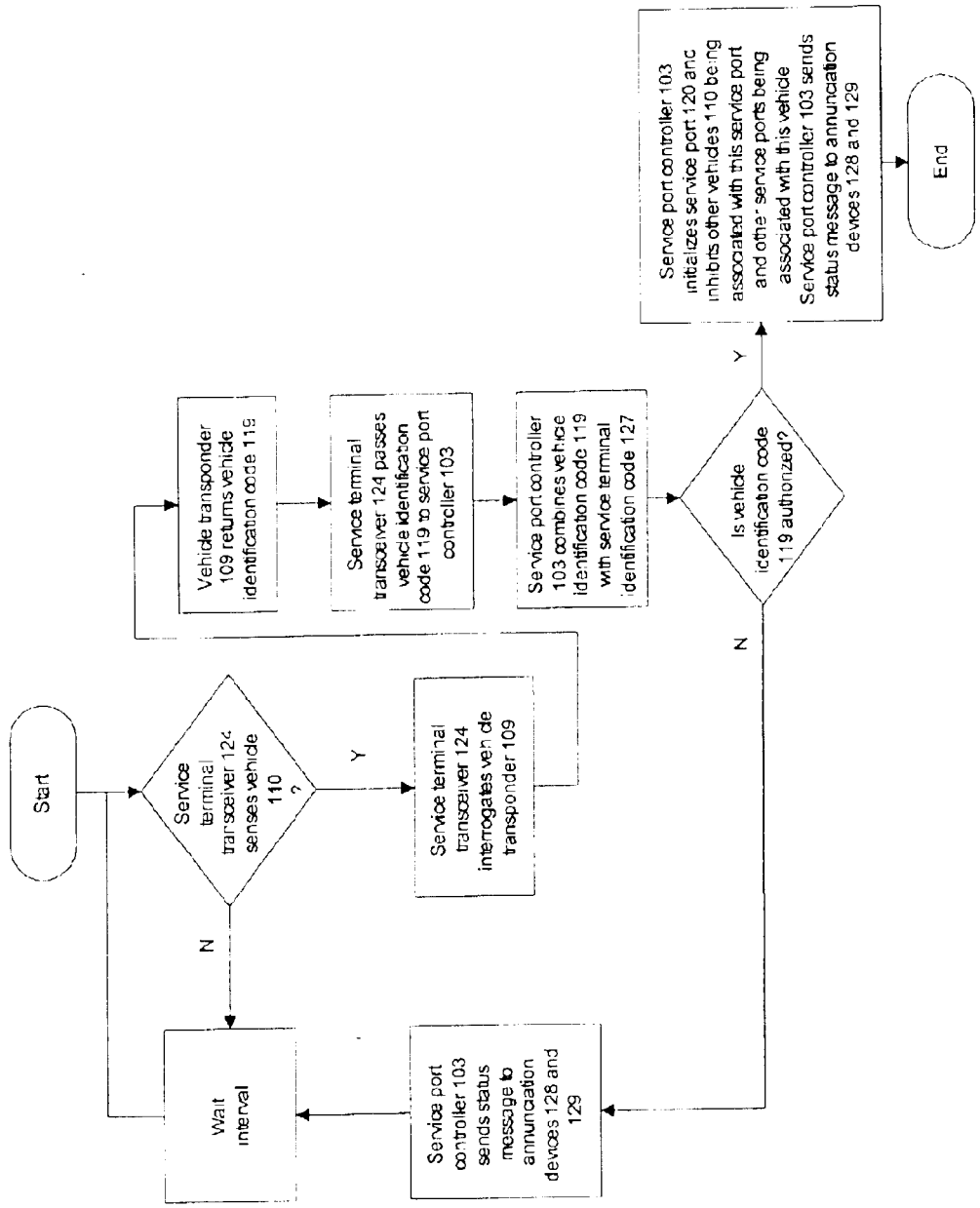
FIG. 9 is a flow chart illustrating the overall data exchange for a single service terminal.

With reference to FIGS. 7 and 9, a vehicle 110b equipped according to the objects of this invention is shown as having entered the zone of proximity detection 123 of a service terminal 101b. In this case, the apparatus that is the subject of the present invention has sensed the location of the vehicle 110b and has sent the vehicle identification code 119 and the service terminal identification code 127 of the service terminal 101b to the service port controller 103b. Alternatively, the service terminal identification code 127 may be internally stored in the service port controller 103b.

FIG. 9 illustrates the manner in which the vehicle and service identification codes are manipulated in order to produce the sought-after results. The service port controller 103 authenticates the vehicle identification code 119 and/or service terminal identification code 127 through at least one of access to a local database (not shown) and network access to a distributed database (not shown). When authorized, the service port controller 103 initiates the pre-coupling service preparation sequence such as a light- or sound-emitting device to alert the vehicle operator that the pre-coupling service preparation sequence is underway.

Similarly, with reference to FIG. 9, an audible annunciation 129 of the status is provided, and controlled by one of port or vehicle controllers 103, 117. The controller 103 sends a status message to an audible annunciation device (not shown) to emit an audible annunciation 129. The audible annunciation 129 provides spoken information that the vehicle 110 is either outside of the zone of proximity detection 123, inside the zone of proximity detection, or is fully docked and that the service operation has commenced. The audible annunciation 129 can also indicate when the service process has been completed, such that the vehicle operator may start the vehicle 110, and depart from the energy exchange station 100. In actual deployment, either a visual display 128, or an audible annunciation 129, or any combination of both may be used, with no loss in generality as to the validity of this invention.

Figure 8:
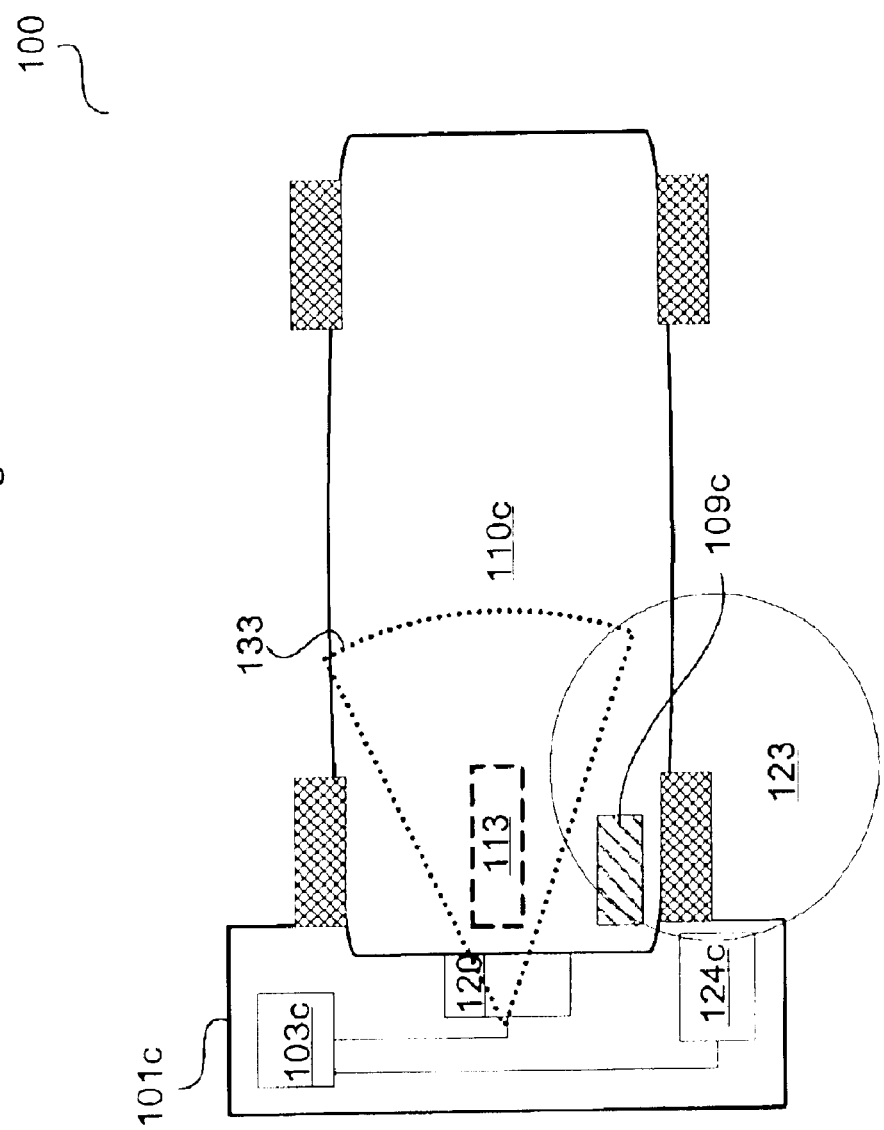
FIG. 8 illustrates a vehicle docked at a service terminal.

FIG. 8 illustrates a vehicle 110c equipped according to the objects of this invention parked at the service terminal 101c. Automatic coupling of the vehicle 110c to the service terminal 101c by means of the connectivity device 113 and the service receptacle 60 has been effected and service exchange is enabled. The zone of proximity detection 123 is defined as the region within which the vehicle 110 is sufficiently close to the service terminal 101; within coupling range 133, such that automatic coupling can be effected. In this and all other embodiments in this disclosure, the zone of proximity detection 123 and the coupling range 133 are shown as separate regions. However, said zone of proximity detection 123 and said coupling range 133 have a uniquely defined spatial relationship, one to the other, which enables the zone of proximity detection to identify the coupling range.

Several preferred embodiments are described below.

Figure 10:
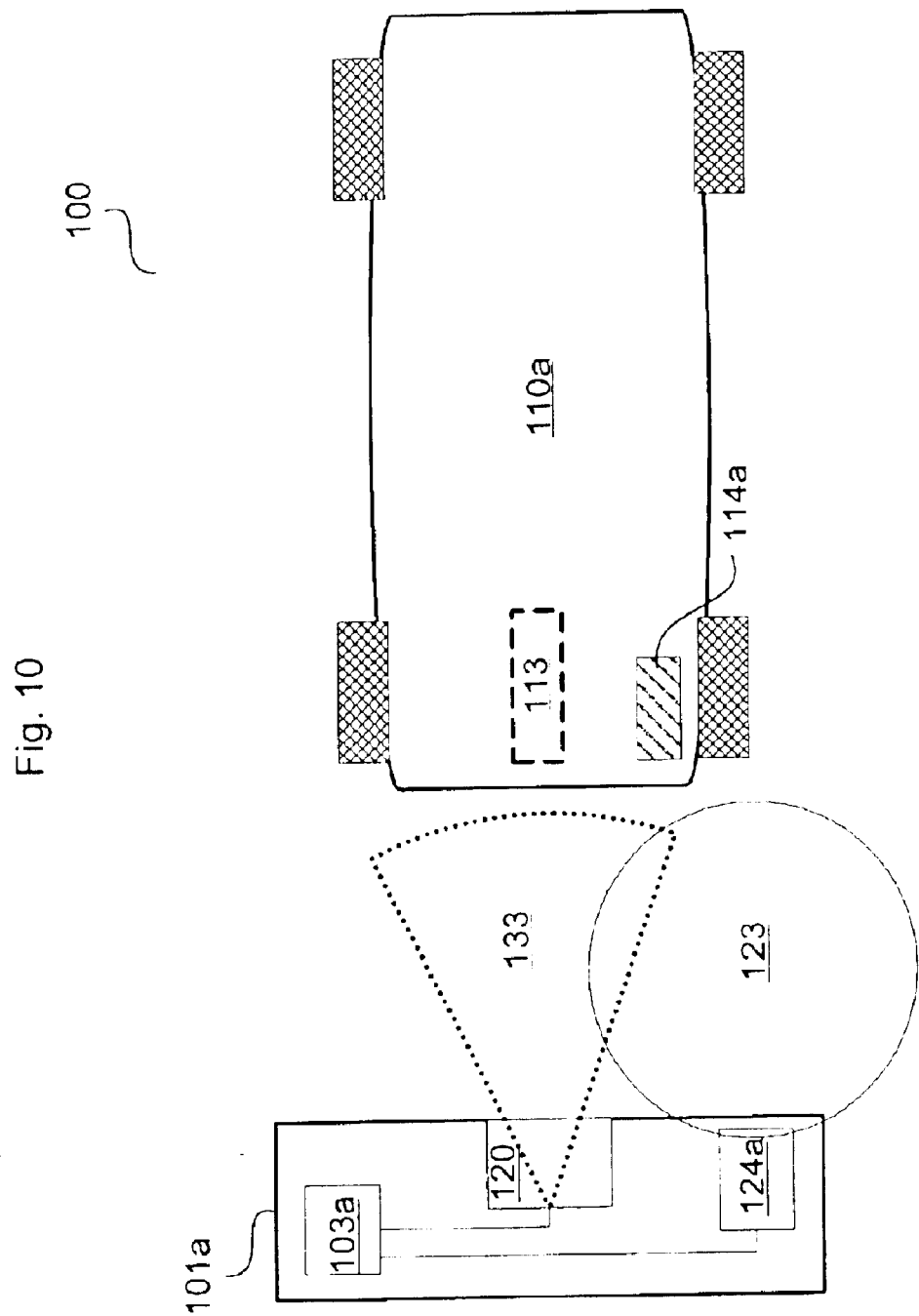
FIG. 10 illustrates a transponder-equipped vehicle approaching a transceiver-equipped service terminal.
Figure 11:
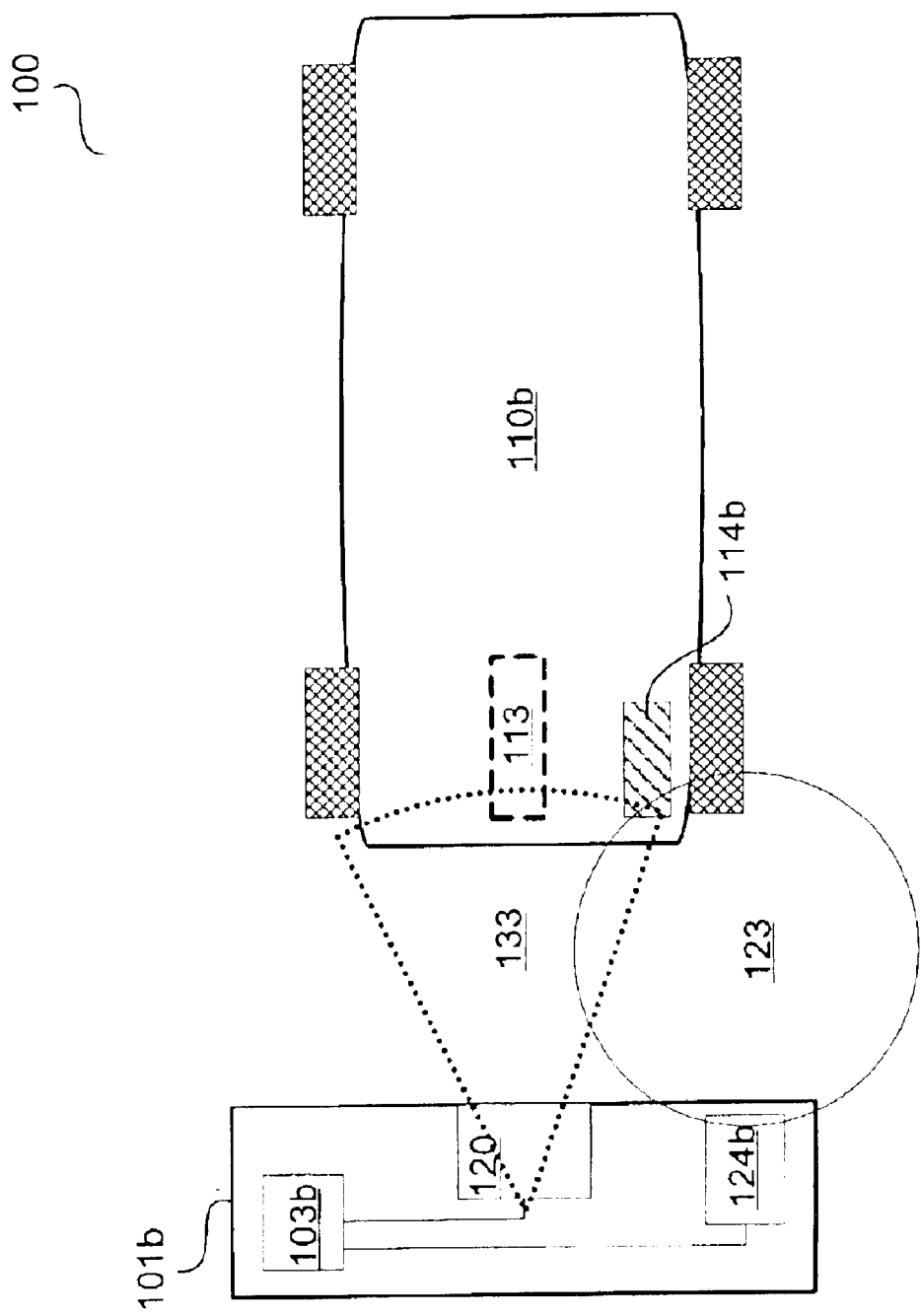
FIG. 11 illustrates a transponder-equipped vehicle within the zone of proximity detection of a transceiver-equipped service terminal.

FIG. 10 shows one embodiment of the present invention in which a vehicle 110a equipped according to the objects of the present invention includes a transponder 114a containing a vehicle identification code 119 (shown in FIG. 13) unique to vehicle 110a and either a connectivity device 113 or a service receptacle 60. The transponder does not require power from the vehicle 110a for operation and is deployed on or in the vehicle in such a way that vehicle identification cannot take place unless the vehicle is within the zone of proximity detection 123 of a service terminal 101b as shown in FIG. 11. An example of a transponder is an RFID tag that responds to a wireless RFID reader.

In this embodiment of the present invention shown in FIGS. 10 to 13, every service terminal 101a, b, and c includes a wireless transceiver 124a, b or c, a service port controller 103a, b, or c, with a service terminal identification code 127, and either a service receptacle 60 or a connectivity device 113, wherein the service terminal delivers or accepts the desired resources, energy and data to or from the vehicle 110a, b or c. The wireless transceiver requires power from the service terminal for operation and is deployed on, in or near the service port 120 in such a way that vehicle identification cannot take place unless the vehicle is within the zone of proximity detection 123 of a service terminal. The service port controller 103a, b or c includes equipment necessary for the operation of the energy exchange system 100 as defined in the present invention.

Figure 13:
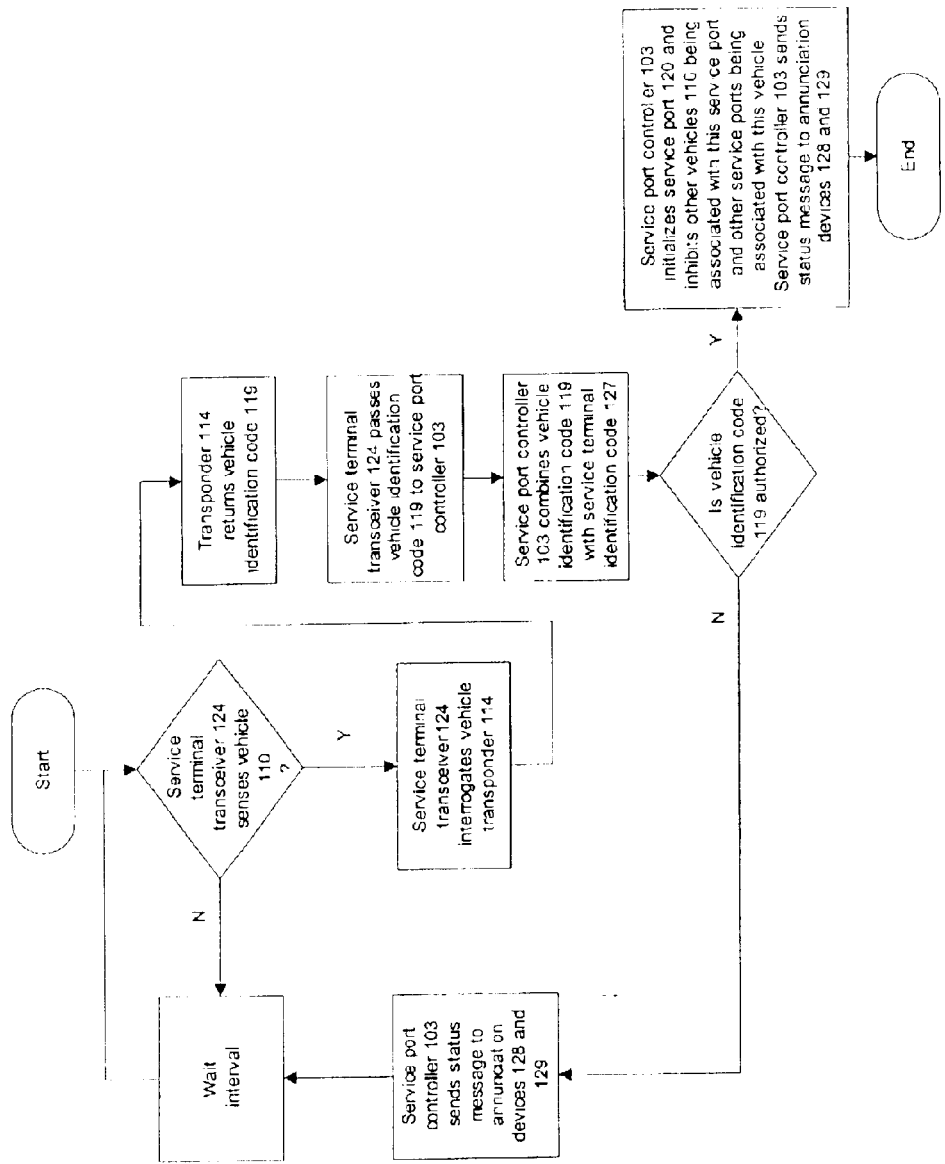
FIG. 13 is a flow chart illustrating the overall data exchange between a transponder-equipped vehicle and a single transceiver-equipped service terminal.
Figure 14:
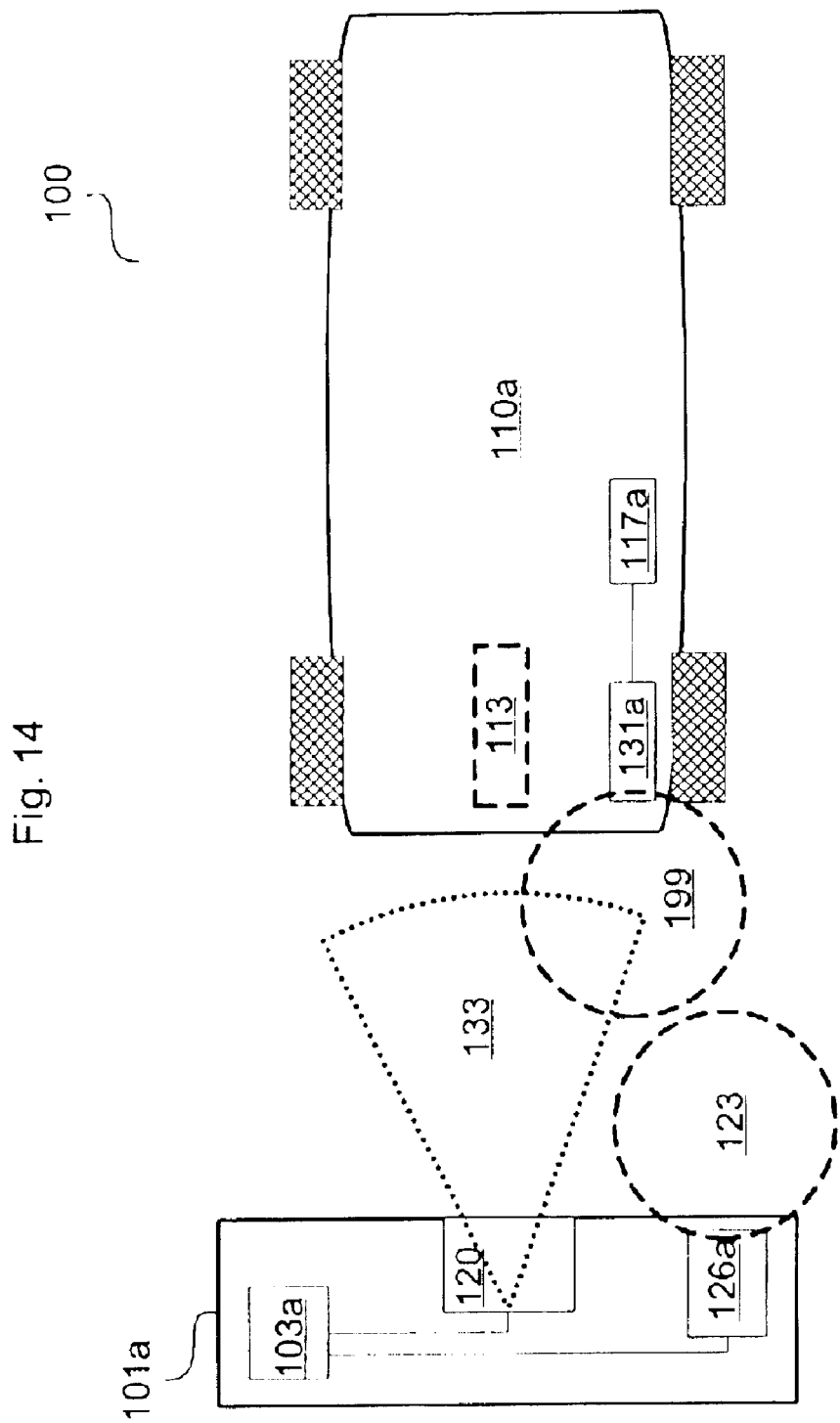
FIG. 14 illustrates a transceiver-equipped vehicle approaching a single transceiver-equipped service terminal.

With reference to FIGS. 11 and 13, in this embodiment of the present invention, a couplable vehicle 110b seeking to couple with a service terminal 101b is driven directly towards the service terminal and enters the zone of proximity detection 123. Once the vehicle 110b is within the zone of proximity detection 123 of the service terminal 101b, the service terminal wireless transceiver 124b successfully interrogates the vehicle transponder 114b and passes the vehicle identification code 119 resident in the transponder to the service port controller 103b. The service port controller 103b combines the vehicle identification code 119 with the service terminal identification code 127. The service port controller 103b then authenticates the vehicle identification code 119 and/or service terminal identification code 127 through at least one of access to a local database (not shown) and network access to a distributed database (not shown). When authorized, the service port controller 103b initiates the pre-coupling service preparation sequence.

Figure 12:
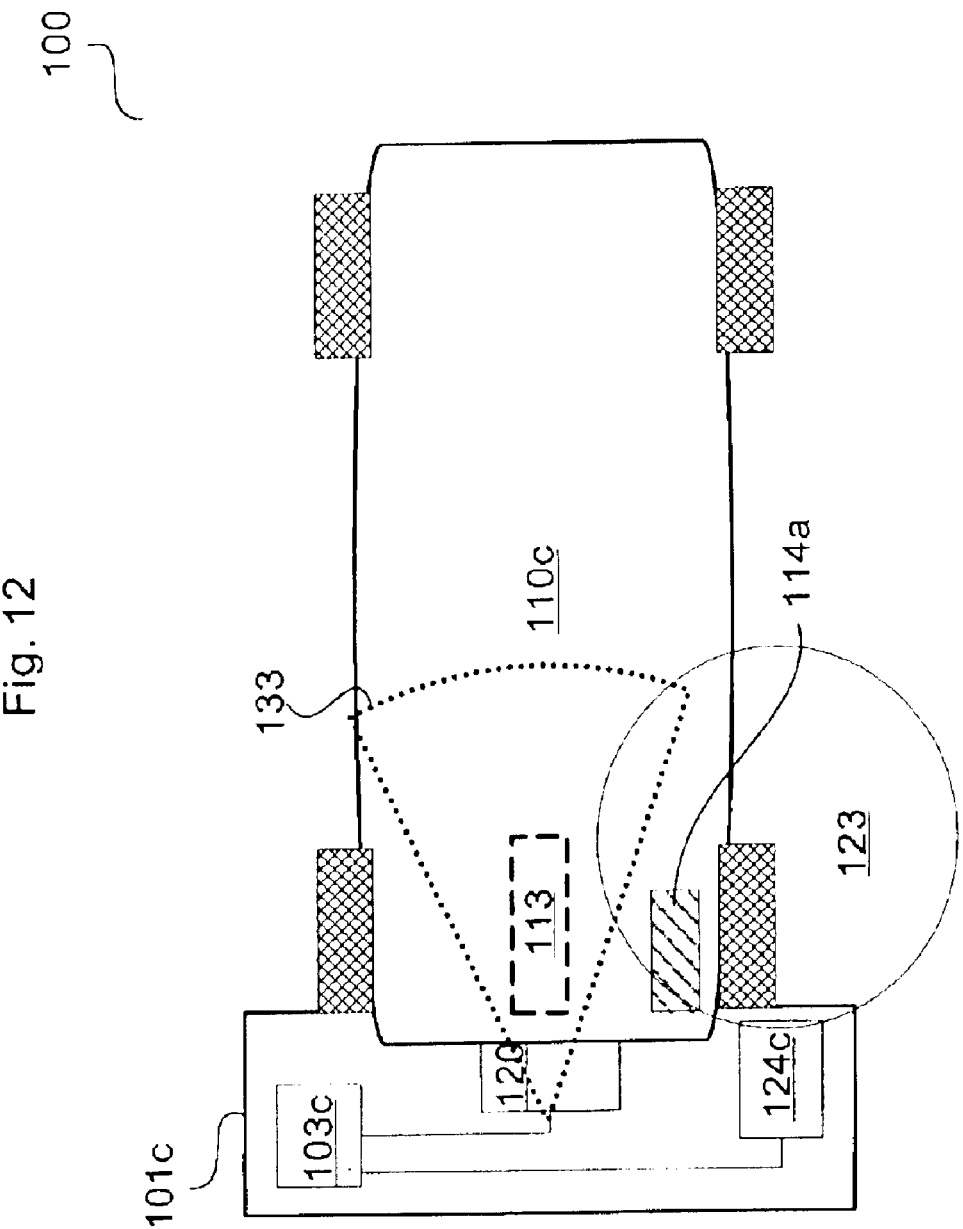
FIG. 12 illustrates a transponder-equipped vehicle docked at a transceiver-equipped service terminal.

In FIG. 12, a vehicle 110c equipped according to the objects of this invention is shown docked at service terminal 101c. Automatic coupling of the vehicle 110c to the service terminal 101c by means of the connectivity device 113 and the service receptacle 60 has been effected and service exchange is enabled.

FIGS. 14 to 17 show another embodiment of the present invention in which a vehicle 110a, b and c, equipped according to the objects of the present invention, includes a vehicle wireless transceiver 131a, b and c, and a vehicle controller 117a, b and c, either of which may contain a unique vehicle identification code 119 and either a connectivity device 113 or a receptacle 60. Every service terminal 101a, b, and c includes a service terminal wireless transceiver 126a, b or c and a service port controller 103a, b or c with a unique service terminal identification code 127, and either a service receptacle 60 or a connectivity device 113, wherein the service terminal delivers or accepts the desired resources, energy and data to or from the vehicle 110a, b or c. The vehicle wireless transceiver 131a, b and c has a sufficiently restricted effective radiated power and is co-located with the vehicle 110a, b and c such that vehicle identification cannot take place unless the service terminal 101a, b, or c is within a vehicle wireless transceiver's zone of proximity detection 199. A typical zone of proximity detection range is of the order of 50 cm to the front of the vehicle wireless transceiver 131a, b or c. Optionally, the vehicle zone of proximity detection 199 may be further adjusted by modifying the service terminal or vehicle wireless transceiver's radiation pattern to effect a narrow beam width. The service port controller 103a, b, or c includes equipment necessary for the operation of the service terminal 101a, b, or c as defined in the present invention.

Figure 15:
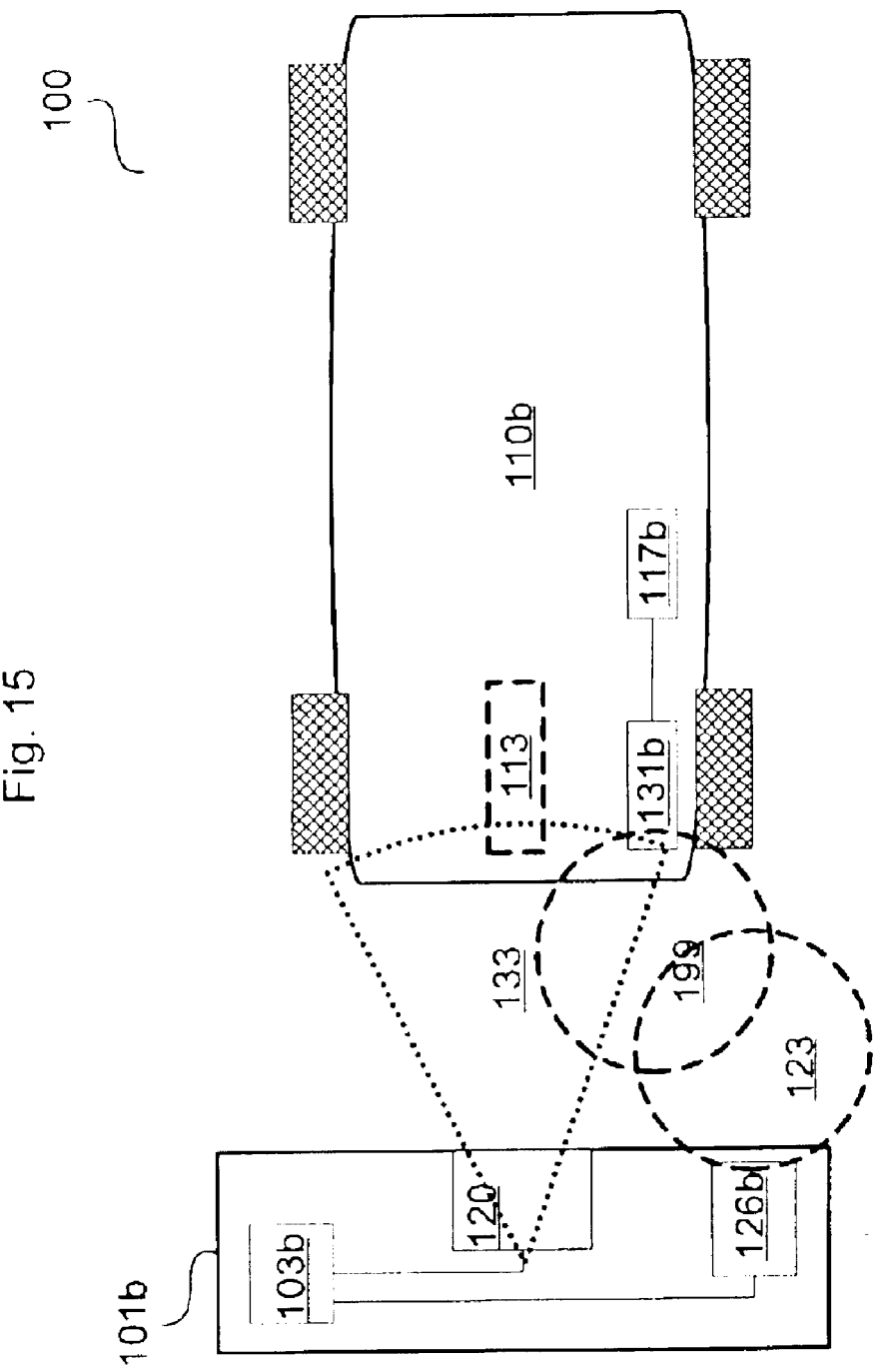
FIG. 15 illustrates a transceiver-equipped vehicle within the zone of proximity detection of transceiver-equipped service terminal.
Figure 17:
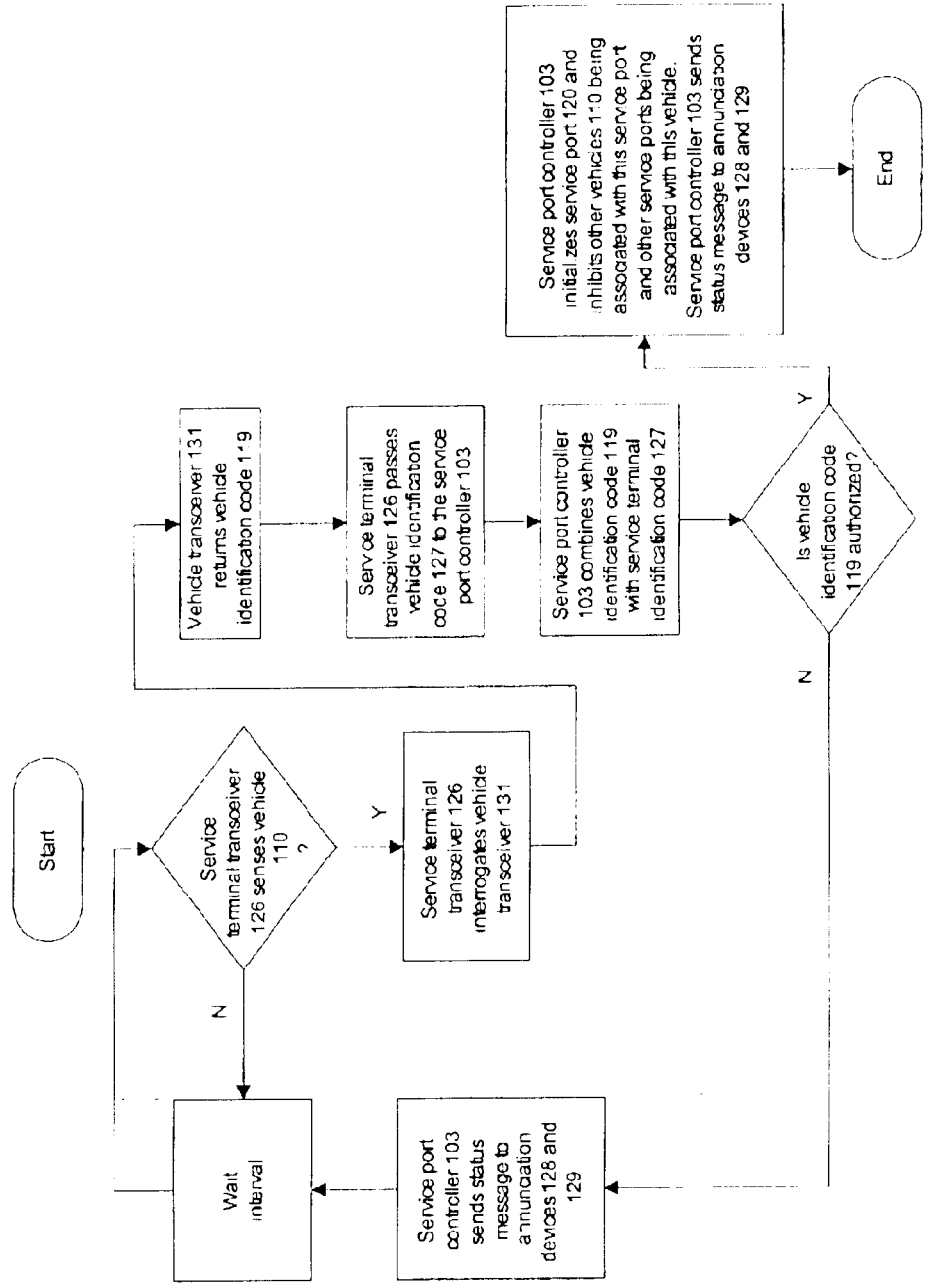
FIG. 17 is a flow chart illustrating the overall data exchange between a transceiver-equipped vehicle and a single transceiver-equipped service terminal.

With reference to FIGS. 15 and 17 in this embodiment of the present invention, a couplable vehicle 110b seeking to couple with a service terminal 101b is driven directly towards the service terminal and enters the zone of proximity detection 123. Once the vehicle 110b is within the zone of proximity detection 123 of the service terminal 101b, the service terminal wireless transceiver 126b successfully interrogates the vehicle wireless transceiver 131b and passes the vehicle identification code 119 received from the vehicle wireless transceiver to the service port controller 103b at the service terminal 101b. The service port controller 103b combines the vehicle identification code 119 with the service terminal identification code 127. The service port controller 103b then authenticates the vehicle identification code 119 and/or service terminal identification code 127 through both access to a local database (not shown) and network access to a distributed database (not shown). When authorized, the service port controller 103 initiates the pre-coupling service preparation sequence.

Figure 16:
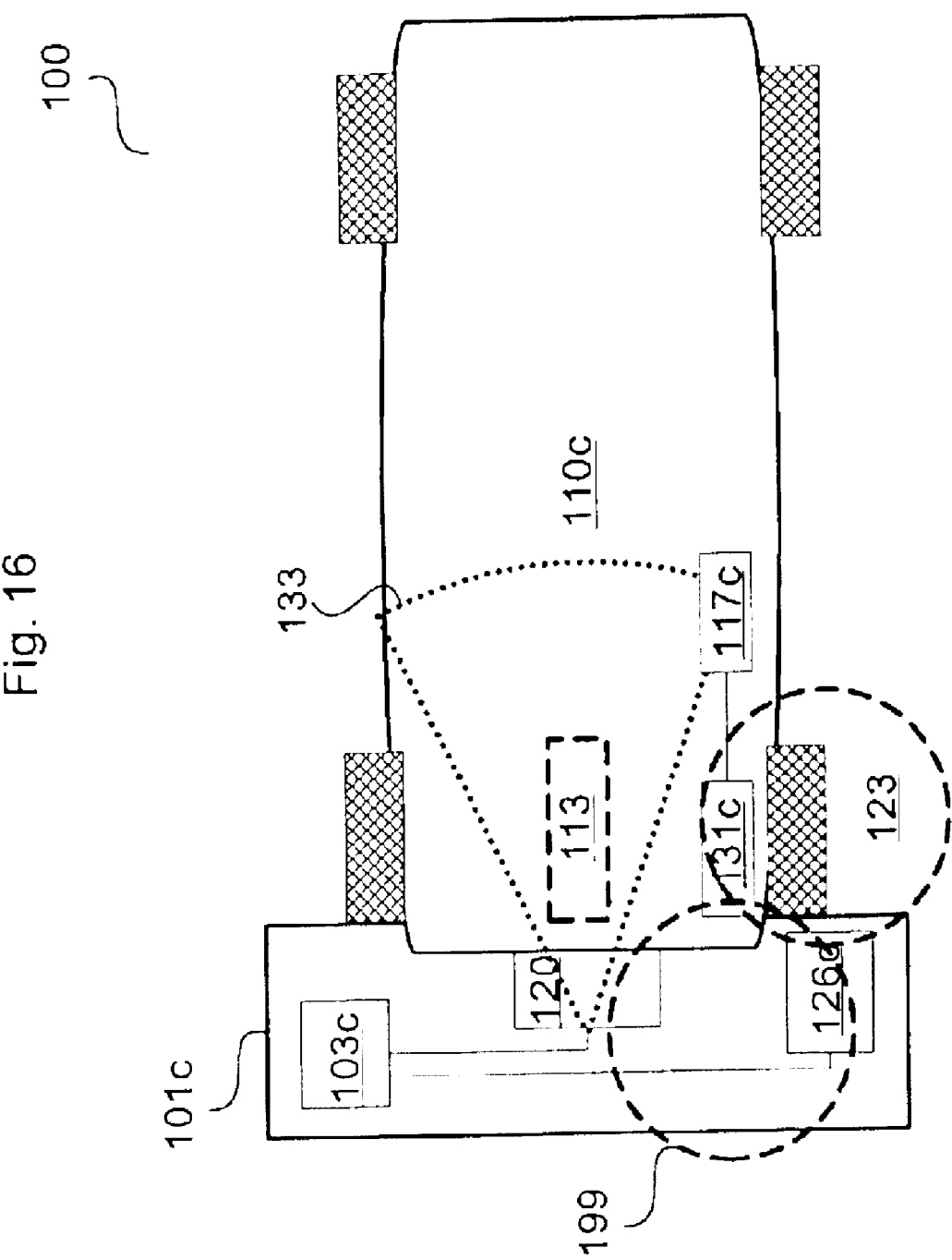
FIG. 16 illustrates a transceiver-equipped vehicle docked at a transceiver-equipped service terminal.

With reference to FIG. 16, a vehicle 110c equipped according to the objects of this invention is shown docked at service terminal 101c. Automatic coupling of the vehicle to the service terminal 101c by means of the connectivity device 113 and the service receptacle 60 has been effected and service exchange is enabled.

The energy exchange system 100 described may be used for sensing and polling the relative position of the vehicle 110 to the service terminal 101 during various processes including coupling, servicing, and de-coupling. The services provided by the service terminal are dependent on presence and authentication data as provided by the invention.

FIGS. 18 to 21 show another embodiment of the present invention in which a vehicle 110a, b or c equipped according to the objects of the present invention includes a first vehicle wireless transceiver 116a, b, or c, a second wireless transceiver 115a, b or c, a vehicle controller 117a, b, or c in which a vehicle identification code 119 is stored, and either a connectivity device 113, or a service receptacle 60. Alternatively, the vehicle identification code 119 may be stored in the vehicle coupling components or vehicle wireless transceivers. Both second wireless transceiver and first wireless transceiver require power from the vehicle for their operation, and are deployed on or in the vehicle in such a way that identification cannot take place unless the service terminal 101 is within the vehicle zone of proximity detection 199.

In this embodiment of the present invention, every service terminal 101a, b, and c includes a transponder 125a, b or c and a service terminal identification code 127, a service port controller 103a, b or c, and either a service receptacle 60 or a connectivity device 113, wherein the service terminal delivers or accepts the desired resources, energy and data to or from the vehicle 101a, b, or c. The transponder does not require power from the service terminal for operation, and is deployed on, in or near the service terminal in such a way that service terminal identification cannot take place unless the service terminal is within the vehicle zone of proximity detection 199. The service port controller includes equipment necessary for the operation of the energy exchange system 100 as defined in the present invention.

Also in this embodiment of the present invention, the service terminal 101a, b or c includes a station wireless transceiver 106, and a secure wireless access controller 104.

Figure 19:
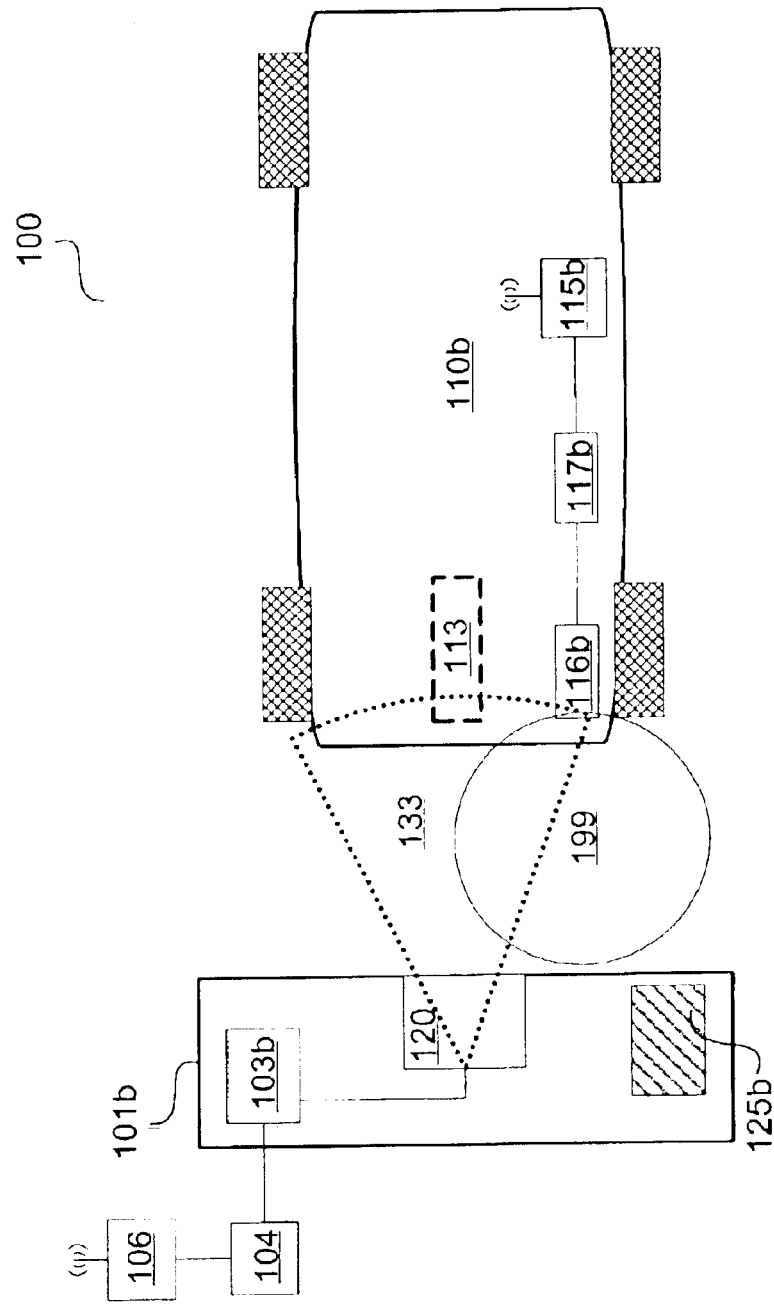
FIG. 19 illustrates a transceiver-equipped vehicle within the zone of proximity detection of a transponder-equipped service terminal in which the vehicle has a second transceiver for communication with a transceiver-equipped service port controller.
Figure 21:
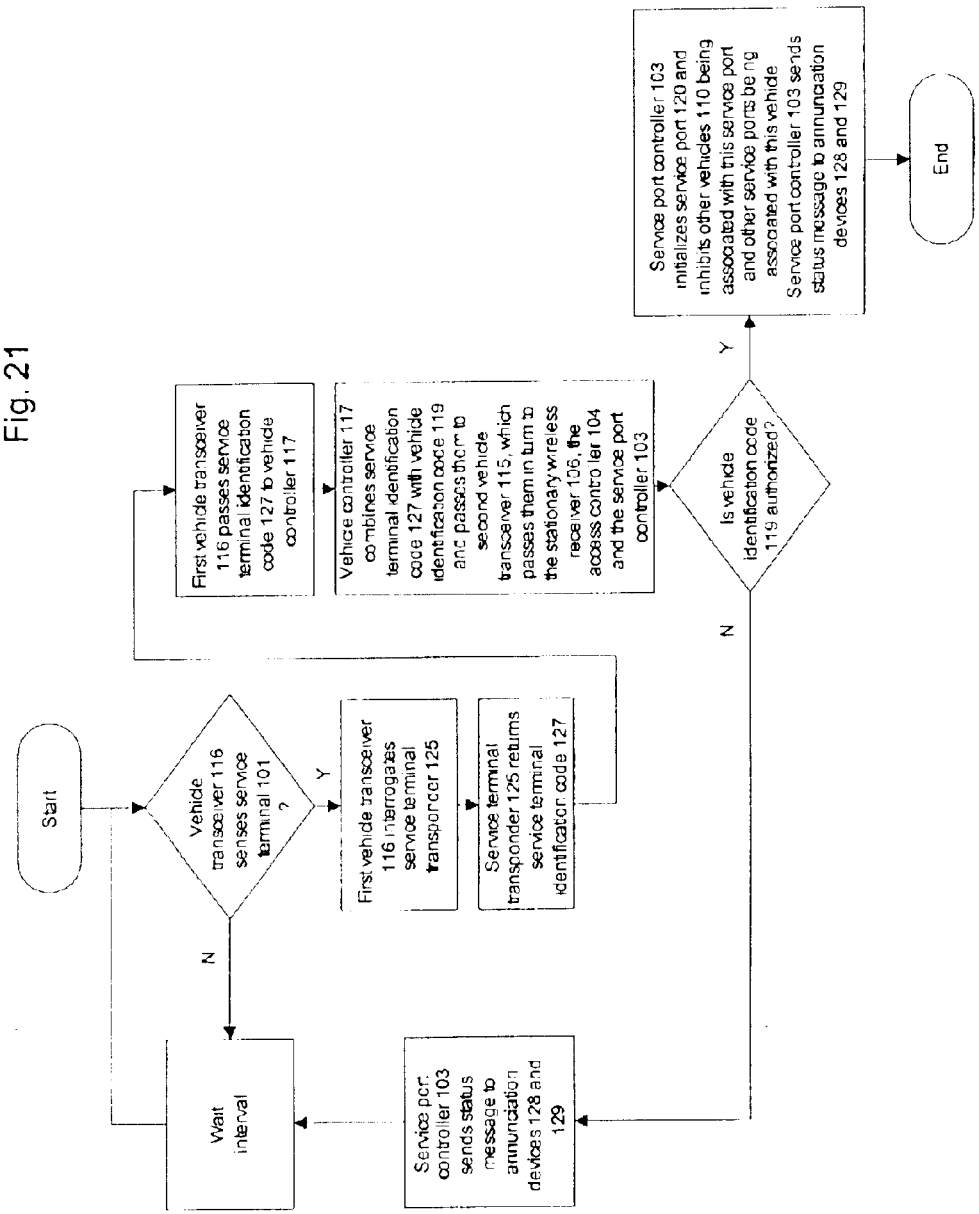
FIG. 21 is a flow chart illustrating the overall data exchange between a transceiver-equipped vehicle and a transponder-equipped service terminal, in which the vehicle has a second transceiver for communication with a transceiver-equipped service port controller.
Figure 22:
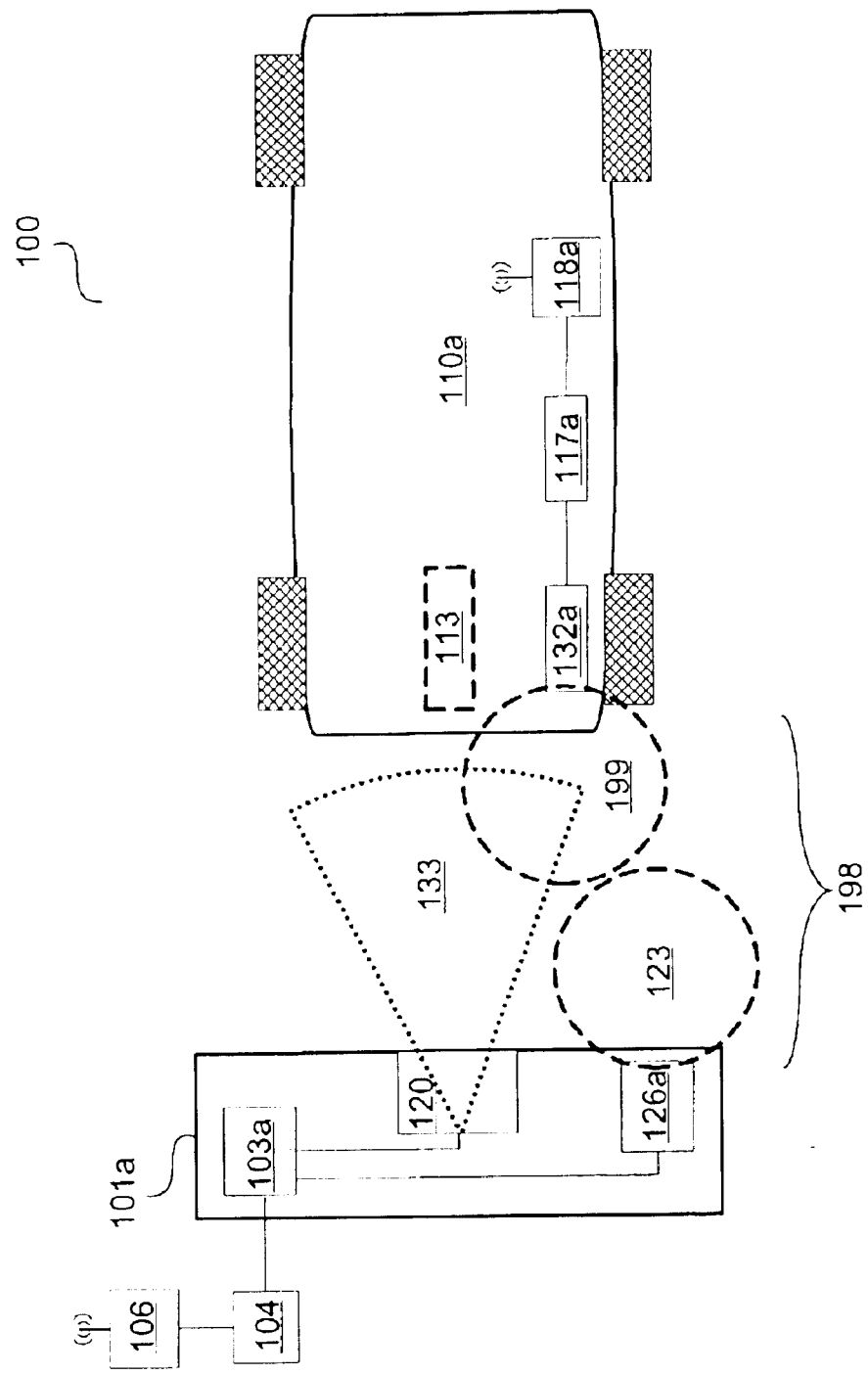
FIG. 22 illustrates a transceiver-equipped vehicle approaching a single transceiver-equipped service terminal, in which the vehicle has a second transceiver for communication with a transceiver-equipped service port controller.

With reference to FIGS. 19 and 21, a vehicle 110b seeking to couple with a service terminal 101b is driven directly towards the service terminal. Once the service port 120b is within the vehicle zone of proximity detection 199, the first vehicle wireless transceiver 116b successfully interrogates the service terminal transponder 125b and passes the service terminal identification code 127, received from the service terminal transponder, to the vehicle controller 117b on the vehicle. The vehicle controller 117b combines the service terminal identification code 127 with the vehicle identification code 119 and passes the combination to the second vehicle wireless transceiver 115b. This second vehicle wireless transceiver 115b transmits the combination of vehicle and service terminal identification codes to the service port controller 103b via the station wireless transceiver 106 and the secure wireless access controller 104. The service port controller 103b then authenticates the vehicle identification code 119 and/or service terminal identification code 127 through at least one of access to a local database (not shown) and network access to a distributed database (not shown). When authorized, the service port controller 103b initiates the pre-coupling service preparation sequence.

Figure 20:
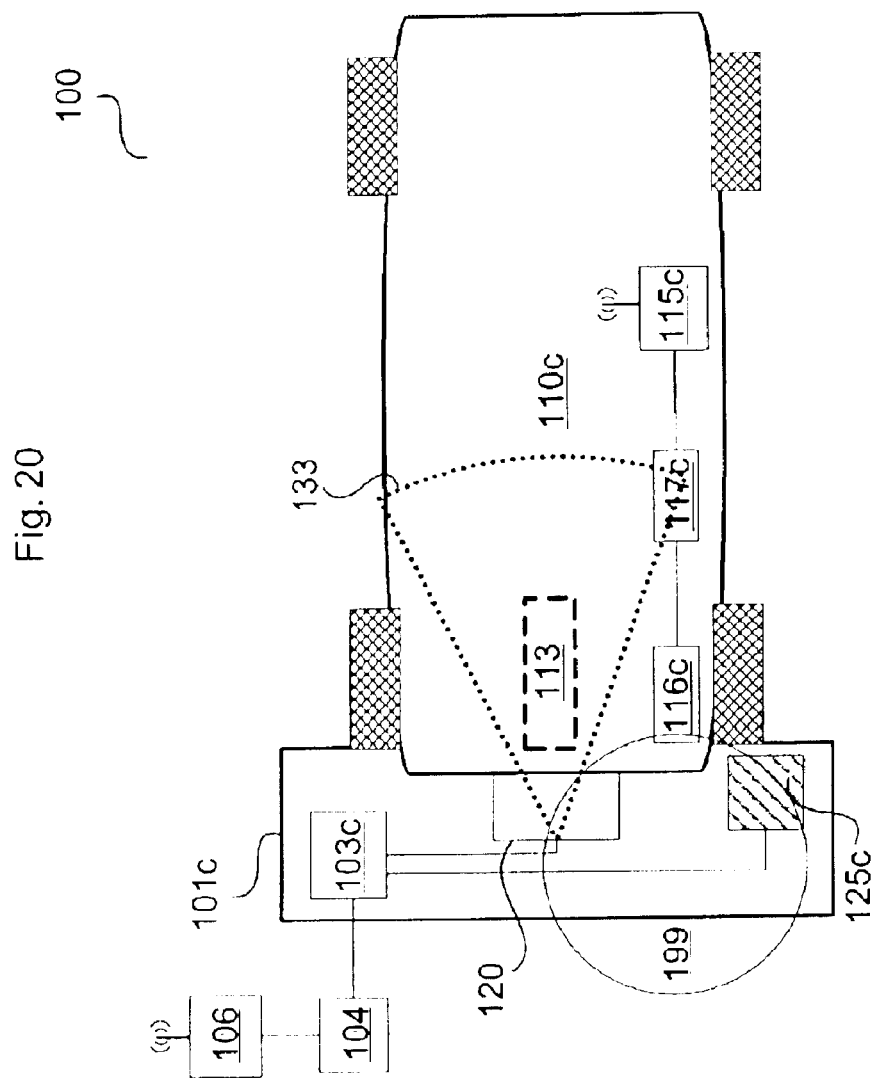
FIG. 20 illustrates a transceiver-equipped vehicle docked at a transponder-equipped service terminal in which the vehicle has a second transceiver for communication with a transceiver-equipped service port controller.

FIG. 20 shows the couplable vehicle 110c docked at service terminal 101c. Automatic coupling of the vehicle 110c to the service terminal 101c by means of the connectivity device 113 and the service receptacle 60 has been effected and service exchange is enabled.

FIGS. 22 to 25 show another embodiment of the present invention in which a vehicle 110a, b or c equipped according to the objects of the present invention includes a first vehicle wireless transceiver 132a, b or c and a vehicle controller 117a, b or c, either of which may contain a unique vehicle identification code 119 and either a connectivity device 113 or a service receptacle 60. The first vehicle wireless transceiver has a sufficiently restricted effective radiated power and is deployed on or in the vehicle such that wireless communications with a service terminal 101a, b or c cannot take place unless the vehicle is within the zone of proximity detection 123 of a service terminal. The service terminal zone of proximity detection 123 may be further adjusted by modifying the service terminal wireless transceiver's radiation pattern to effect a narrow beam width. In addition, the vehicle includes a second vehicle wireless transceiver 118a, b, or c that is capable of communicating with a station wireless transceiver 106 located at the service terminal while the vehicle is on the service station premises. This second vehicle wireless transceiver is located on the vehicle for the purpose of communicating with the station wireless transceiver 106 or wireless access point (not shown) associated with the service terminal, and is connected to the vehicle controller.

In this embodiment of the present invention, every service terminal 101a, b, and c includes a service terminal wireless transceiver 126a, b or c, a service port controller 103a, b, or c with an associated service terminal identification code 127, and either a service receptacle 60 or a connectivity device 113, wherein the service terminal delivers or accepts the desired resources, energy and data to or from the vehicle. The service port controller includes equipment necessary for the operation of the service terminal as defined in the present invention.

Also in this embodiment of the present invention, the service terminal 101a, b or c includes a station wireless transceiver 106, and a secure wireless access controller 104.

Figure 23:
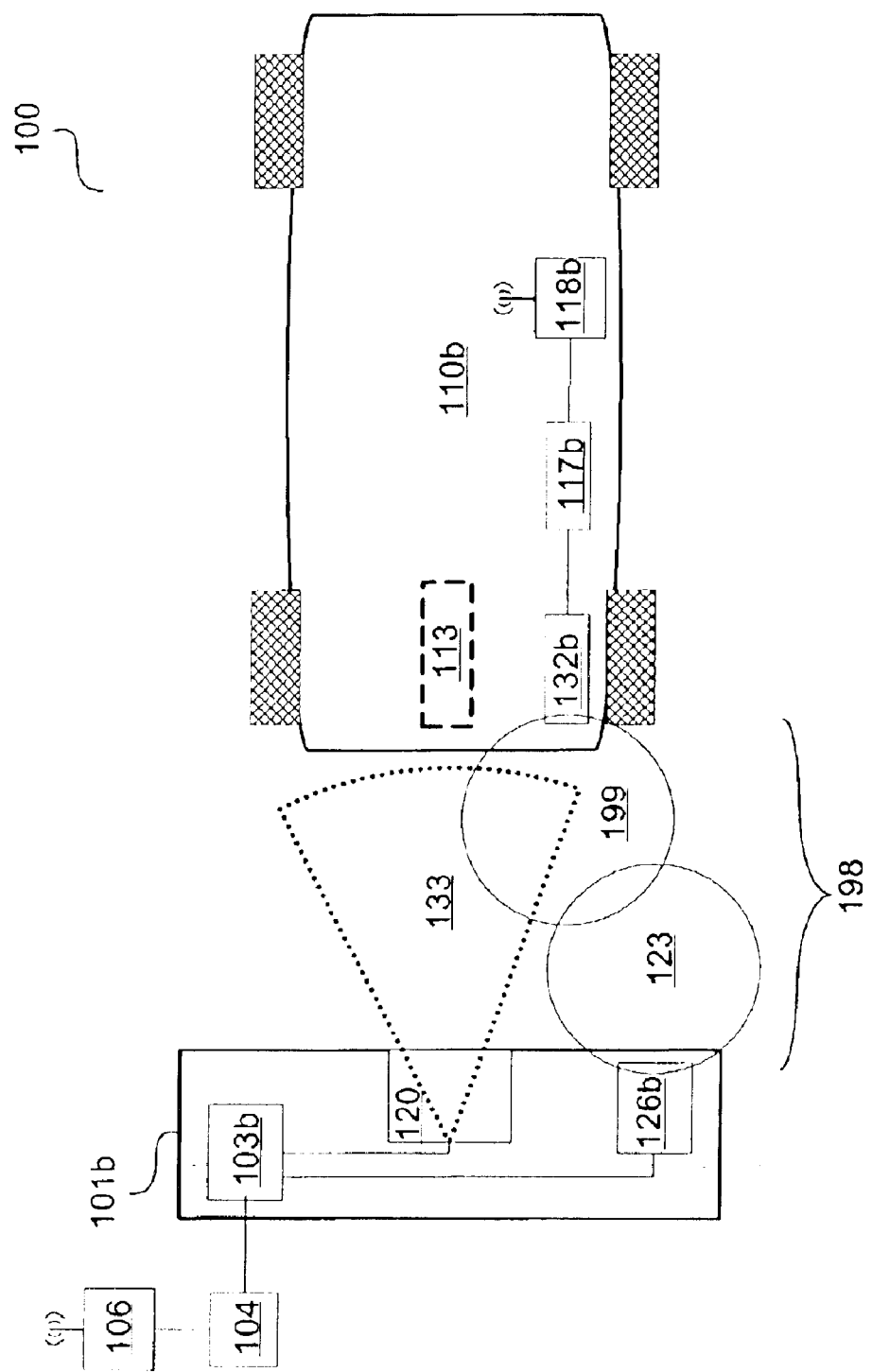
FIG. 23 illustrates a transceiver-equipped vehicle within the zone of proximity detection of a transceiver-equipped service terminal in which the vehicle has a second transceiver for communication with a transceiver-equipped service port controller.
Figure 25:
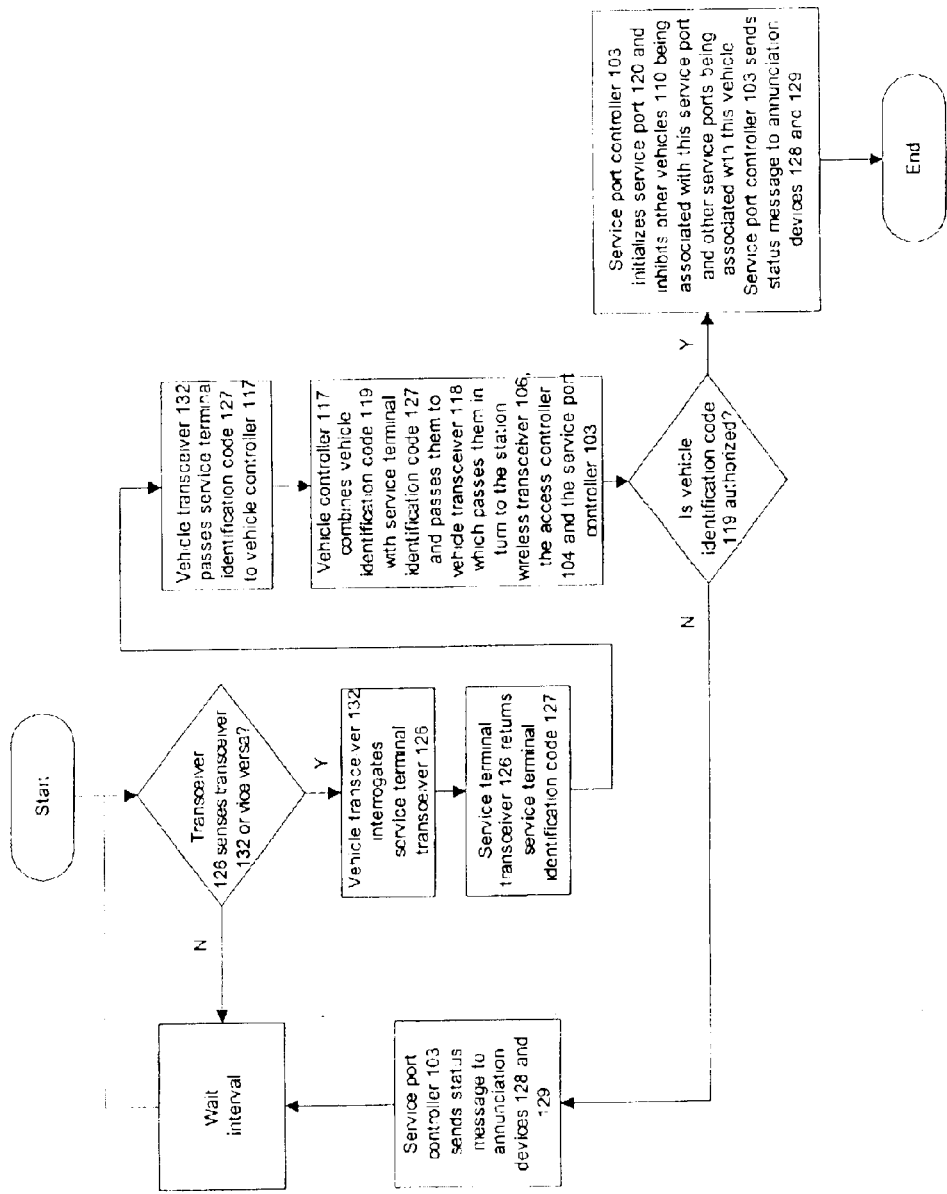
FIG. 25 is a flow chart illustrating the overall data exchange between a transceiver-equipped vehicle and a dual transceiver-equipped service terminal, in which the vehicle has a second transceiver for communication with a transceiver-equipped service port controller.

With reference to FIGS. 23 and 25, in this embodiment of the present invention, a vehicle 110b seeking to couple with a service terminal 101b is driven directly towards the service terminal and the vehicle's zone of detection overlaps with the service terminal's zone of proximity detection 123. Once the vehicle 110b is located within the combined zones of proximity detection 198 associated with the selected service terminal 101b, the first vehicle wireless transceiver 132b associated with the vehicle successfully interrogates the service terminal wireless transceiver 126b and passes the service terminal identification code 127 received from the service terminal wireless transceiver 126b to the vehicle controller 117b. The vehicle controller 117b combines the service terminal identification code 127 with the vehicle identification code 119 and passes the combination of identification codes to a second vehicle wireless transceiver 118b. This second vehicle wireless transceiver 118b transmits the combination of identification codes to the service port controller 103b via the station wireless transceiver 106 and the secure wireless access controller 104. The service port controller 103b then authenticates the vehicle identification code 119 and/or service terminal identification code 127 through one or both of access to a local database (not shown) and network access to a distributed database (not shown). When authorized, the service port controller initiates the pre-coupling service preparation sequence.

Figure 24:
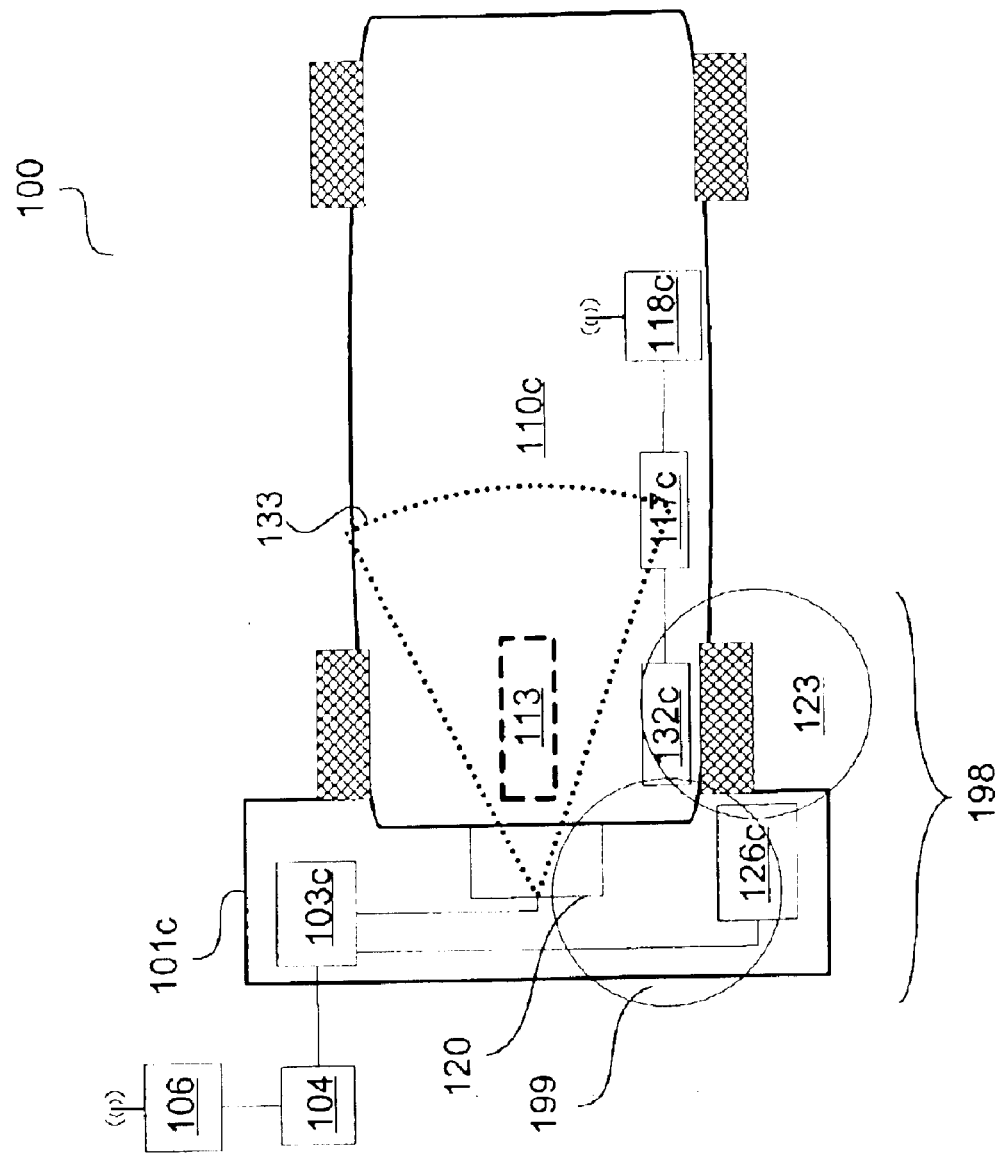
FIG. 24 illustrates a transceiver-equipped vehicle docked at a transceiver-equipped service terminal in which the vehicle has a second transceiver for communication with a transceiver-equipped service port controller.

FIG. 24 shows a couplable vehicle 110c docked at service terminal 101c. Automatic coupling of the vehicle to the service terminal by means of the connectivity device 113 and the service receptacle 60 has been effected and service exchange is enabled.

In all the preceding embodiments the transceiver and transponder functions may be implemented using a variety of means, including but not limited to passive RFID tags and active RFID readers, optical markers and optical marker readers, RF transponders and RF interrogators, ultrasonic transponders and ultrasonic interrogators, bar code labels and bar code readers, or bilateral optical apparatus. The transponder may incorporate the TIRIS™ system produced by Texas Instruments Incorporated. The TIRIS™ system includes a radio frequency module (RFM), which is the transceiver portion of an active RFID reader, and a passive RFID tag. One model of the RFM is designated with the part number RI-REM-0078, made by Texas Instruments Incorporated. This transceiver uses a frequency of 134.2 kHz for transmission and reception. This transceiver can be combined with data processing equipment to meet custom applications. An example of a passive RFID tag is tag designated by the part number RI-TRP-R9VS, made by Texas Instruments Incorporated.

It will be evident to those skilled in the art that the communications between vehicle 110 and service port controller 103 may also be used for guidance when positioning the vehicle for coupling and are included in this invention.

Figure 26:
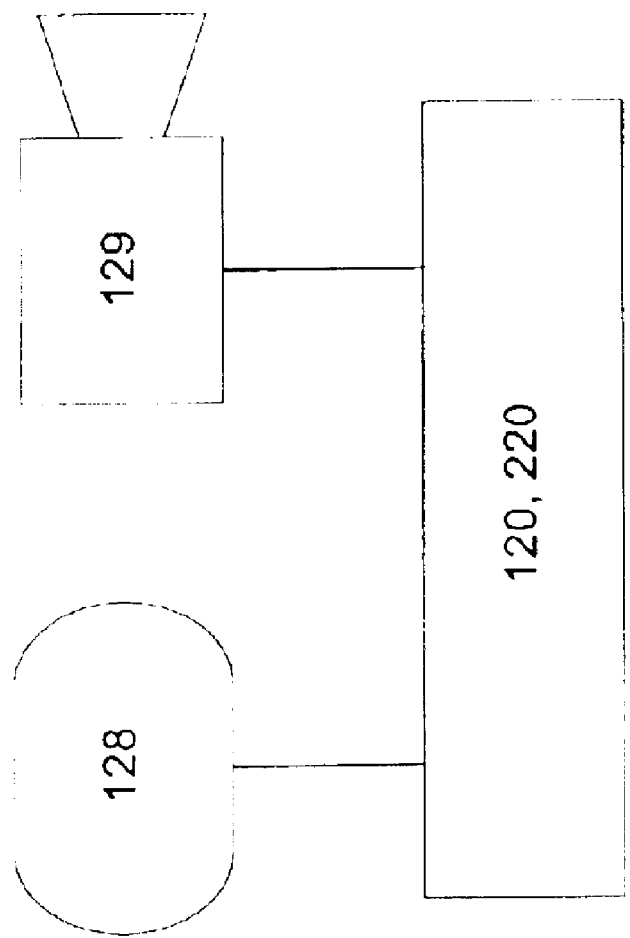
FIG. 26 depicts the visual and audible annunciation system.

As a further enhancement, a visual display 128, as depicted in FIG. 26, at each service terminal 101 provides an indication to the vehicle operator that the vehicle 110 is either outside of the zone of proximity detection 123, inside the zone of proximity detection, or is fully docked and that the service operation has commenced. Such visual display can also display when the service process has been completed, such that the vehicle operator may start the vehicle 110, and depart from the energy exchange station 100.

Similarly, with reference to FIG. 26, an audible annunciation of the status is provided through an audible annunciation device 129 such as a loudspeaker, and controlled by one of station, port or vehicle controllers 203, 103, 117, 217. The controller sends a status message to an audible annunciation device 129 to emit an audible annunciation. The audible annunciation device 129 generates spoken information that the vehicle 110 is either outside of the zone of proximity detection 123, inside the zone of proximity detection, or is fully docked and that the service operation has commenced. Likewise, the audible annunciation device 129 generates spoken information that the service port 120 is either outside of the vehicle zone of proximity detection 199, or inside the zone of proximity detection, or that the two zones of proximity detection 199, 198 are not overlapping or are overlapping. The audible annunciation device 129 can also indicate when the service process has been completed, such that the vehicle operator may start the vehicle 110, and depart from the energy exchange station 100. In actual deployment, either a visual display 128, or an audible annunciation device 129, or any combination of both may be used, with no loss in generality as to the validity of this invention.

As described in FIGS. 27 to 35, embodiments of the present invention are also extended to energy exchange stations 201 containing a multiplicity of service terminals 220. Several preferred embodiments of the case for multiple service terminals 220 are described in the following. In the following embodiments of the present invention, the energy exchange station 201 includes a station controller 203, which includes equipment necessary for the operation of the energy exchange station 201. The energy exchange stations may be connected to energy exchange networks 80.

Figure 27:
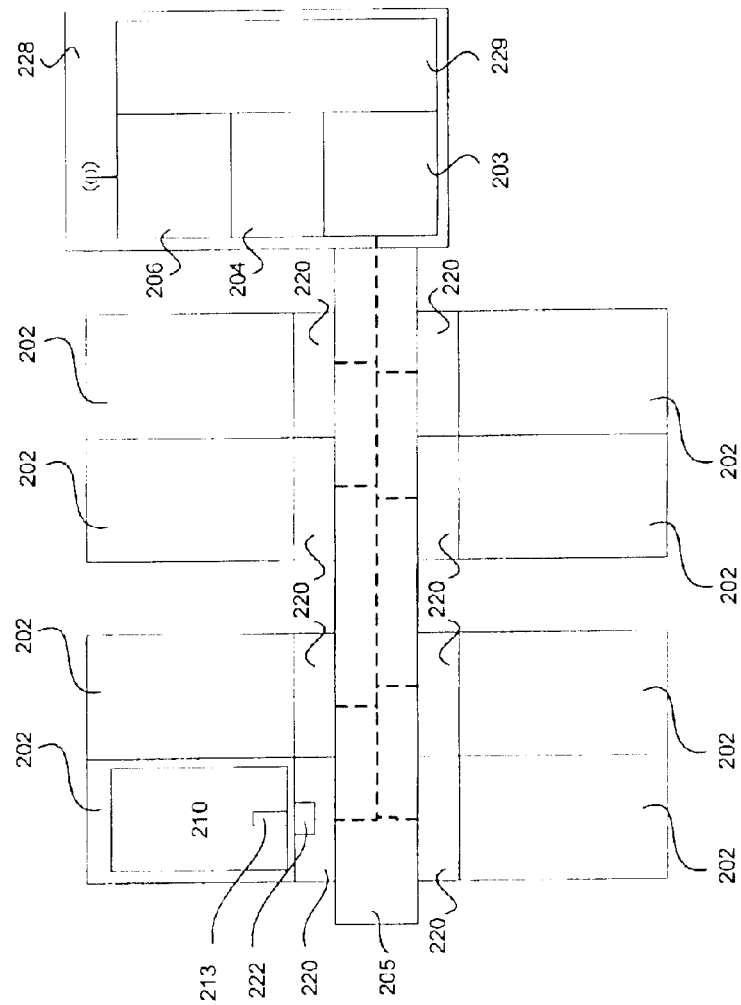
FIG. 27 illustrates an energy exchange station.

With reference to FIG. 27 the energy exchange station 201 is seen to consist of one or more service stalls 202 containing service terminals 220 for the purpose of supplying services to vehicles that are couplable with the service ports 222 located on the service terminals. The service stalls 202 are located adjacent to one another, or opposite one another, or separated by a central median 205, or any combination of the preceding. Any number of service stalls 202 may be simultaneously used by vehicles 110, 210 up to and including the total number of service stalls on the energy exchange station 201. A station housing 228 is deployed centrally to accommodate storage, regeneration, energy management, as well as all control apparatus at the energy exchange station 201. A station controller 203, connected to the service terminals 220, is used for the overall monitoring and control of the energy exchange station 201. The station controller 203 may store information on vehicles 210 authorized to couple to the energy exchange station 201. The station controller 203 may optionally have network access to vehicle and energy exchange databases (not shown) as described earlier. The features and functions of the station controller 203 and the service terminal 220 are not restricted to those contained in this disclosure and will be obvious to those skilled in the art. A station wireless transceiver 206 and a secure wireless access controller 204 may also be connected to the station controller 203 and located in the station housing 228. Also, the energy exchange station 201 is capable of bidirectional transfer of services through the service terminals 220.

Figure 28:
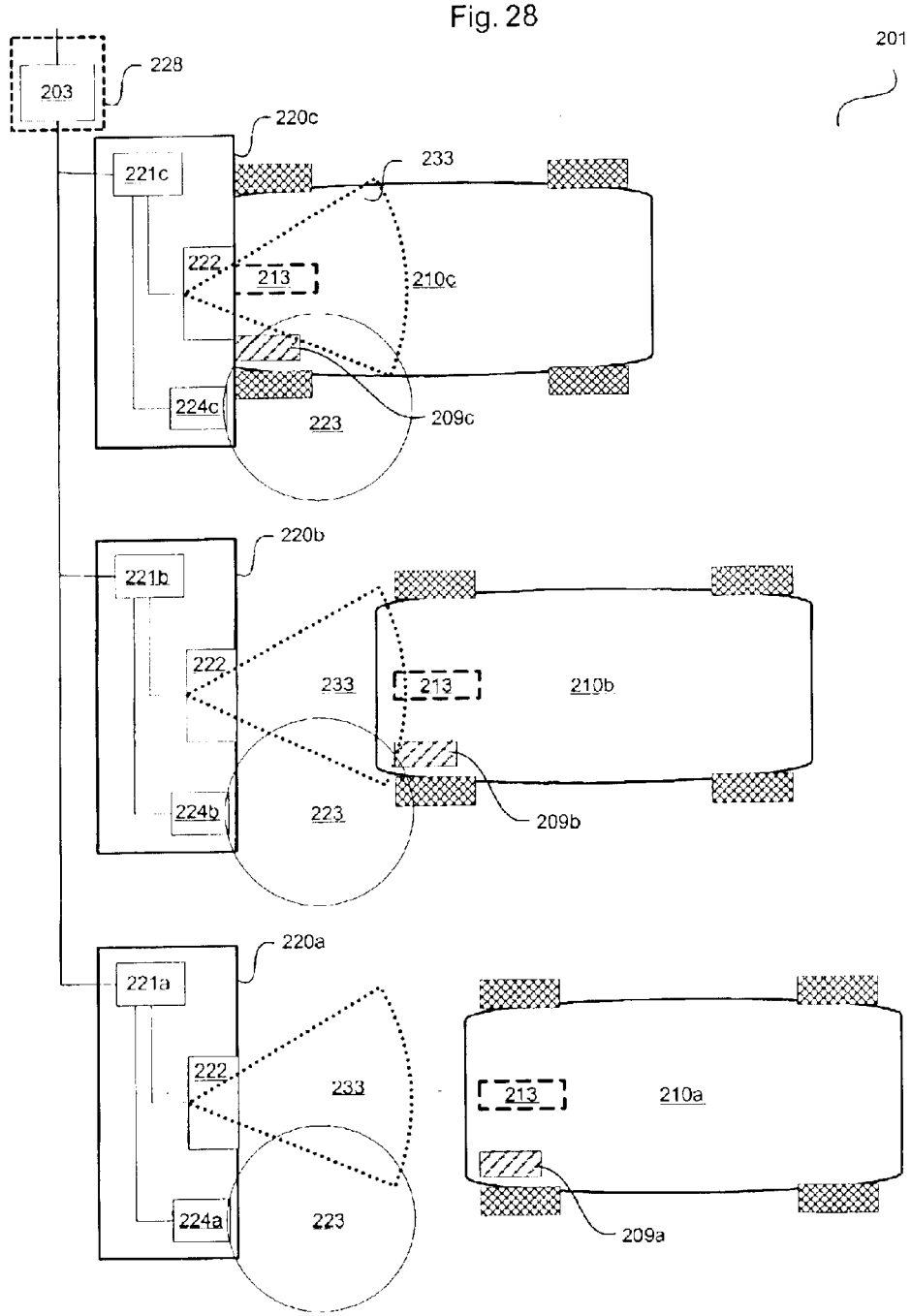
FIG. 28 illustrates the operation of an energy exchange station, in which a transponder-equipped vehicle approaches and docks with a transceiver-equipped service terminal.

With reference to FIG. 28, the connection from the service port 222 to the vehicle 210 is typically automated such that no manual intervention is required to dock and connect the vehicle to the service port. The connection between the vehicle 210 and the service port 222 of a service terminal 220 is by means of a connectivity device 213 coupled to a service receptacle 60, both of which must be within a relatively close range for automatic docking once the vehicle 210 is parked, this range being defined as the coupling range 233. Either the connectivity device 213 or the service receptacle 60 may be located on either the vehicle 210 or the service port 222 to enable automatic docking.

The zone of proximity detection 223 is defined as the region within which the vehicle 210 is sufficiently close to the service terminal 220; within coupling range 233, such that automatic coupling can be effected. In this and all other embodiments in this disclosure, the zone of proximity detection 223 and the coupling range 233 are shown as separate regions. However, said zone of proximity detection 223 and said coupling range 233 have a uniquely defined spatial relationship, one to the other, which enables the zone of proximity detection to identify the coupling range. The detection and communications systems of the invention are necessary for accurate and secure coupling with limited actions necessary by the vehicle operator.

Figure 29:
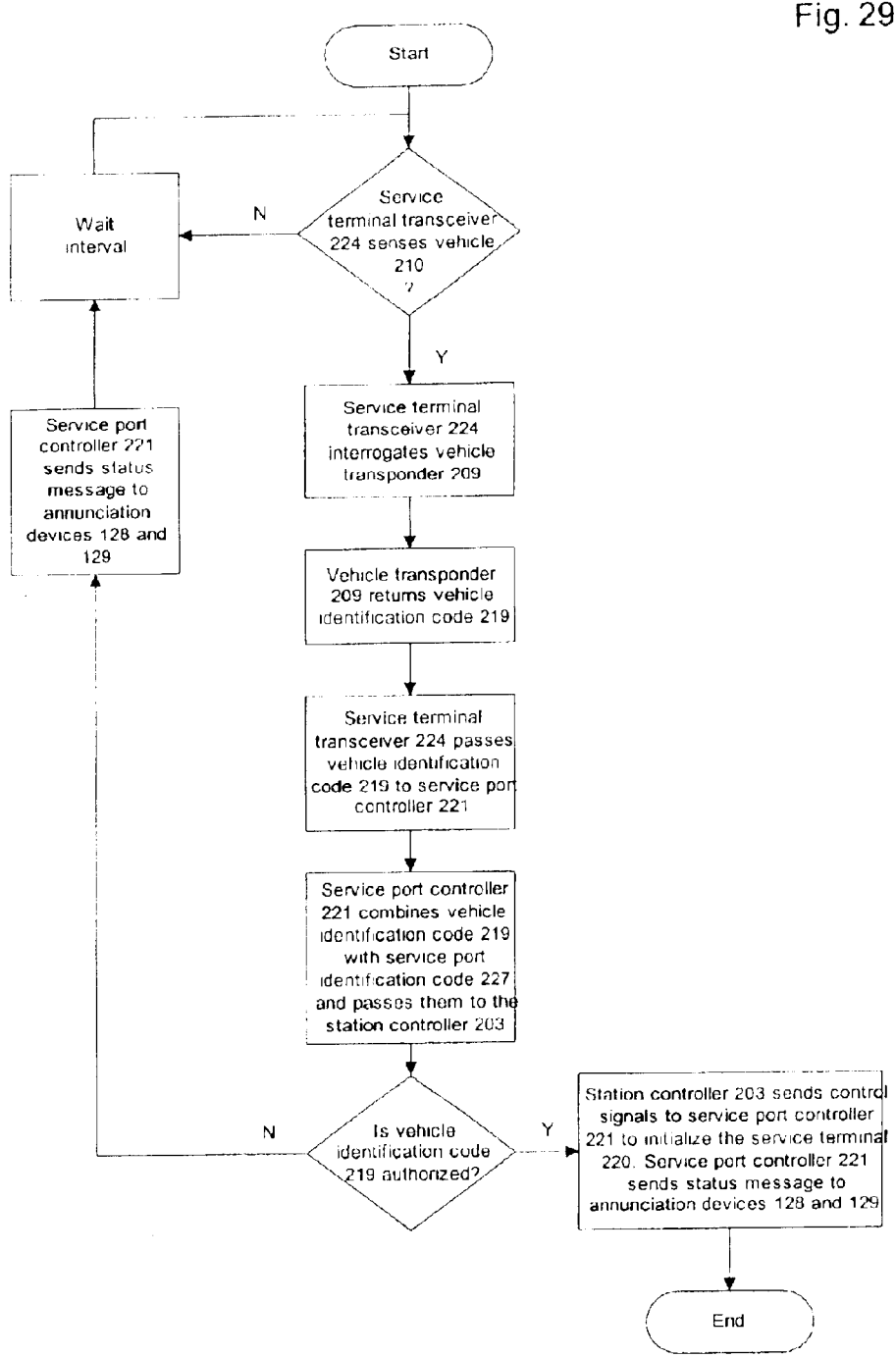
FIG. 29 is a flow chart illustrating the data exchange between a transponder-equipped vehicle and a transceiver-equipped service terminal at an energy exchange station.

The overall operation of the energy exchange station 201 for use with multiple service terminals 220 that is the subject of the present invention can be understood by reference to FIGS. 28 and 29. In these figures, three vehicles 210a, 210b, and 210c have been depicted in a consistent manner, in order to illustrate the different locations of the vehicles equipped for monitored coupling to the service ports 222. Likewise, the service terminals 220 associated with the three vehicles 210a, 210b, and 210c have been designated as 220a, 220b, and 220c, respectively. Likewise, the service port controllers have been designated as 221a, 221b and 221c. Likewise, the service terminal wireless transceiver has been designated as 224a, 224b and 224c. Likewise, the vehicle wireless transponders 209 have been designated 209a, 209b and 209c.

In this embodiment, the wireless transponder 209a, b or c does not require power from the vehicle 210a, b or c for operation and is deployed on or in the vehicle in such a way that vehicle identification cannot take place unless the vehicle is within the zone of proximity detection 223. An example of a wireless transponder 209a, b or c is an RFID tag that responds to a wireless RFID reader. An example of a wireless transceiver 224a, b or c is a wireless RFID reader.

A vehicle 210a, b, or c equipped according to the objects of this invention includes a vehicle identification code 219. This vehicle identification code 219 can be a unique number, originated solely for the purpose of implementing the objects of this invention. The vehicle identification code 219 can also include the VIN number, which is an industry-standard means of identifying an individual vehicle. Further, this vehicle identification code 219 can be extended to identify which class of a group of classes the vehicle belongs to. These classes may consist of any categories to which vehicles 210 may be assigned, and may relate to type or configuration of service terminal 220 associated with that class of vehicles.

In this embodiment of the present invention, all service terminals 220a, b, and c include wireless transceiver 224a, b, or c, a service port controller 221a, b, or c with a service port identification code 227 and either a service receptacle 60 or a connectivity device 213, wherein the service terminal delivers or accepts the desired resources, energy and data to or from the vehicle 210a, b or c. The wireless transceiver 224a, b, or c requires power from the service terminal 220a, b or c for operation and is deployed on, in or near the service terminal in such a way that vehicle identification cannot take place unless the vehicle 210a, b or c is within the zone of proximity detection 223 of a service terminal and such that only the service terminals that is in closest proximity to the vehicle can sense proximity of those specific vehicles.

In this embodiment of the present invention, FIG. 28 depicts a vehicle 210a entering a service stall 202, while still outside of the zone of proximity detection 223 and has not yet been detected by wireless transceiver 224a at service terminal 220a. A typical zone of proximity detection range is of the order of 50 cm. Thus, in this case, vehicle 210a is outside of the zone of proximity detection 223 and the presence of the vehicle is not detected by the wireless transceiver 224a at the service terminal 220a.

FIG. 28 also illustrates a vehicle 210b within the zone of proximity detection 223 of the selected service terminal 220b. The wireless transceiver 224b associated with that service terminal 220b successfully interrogates the transponder 209b associated with the vehicle 210b and passes the vehicle identification code 219 resident in the transponder 209b, to the service port controller 221b for that service terminal 220b. The service port controller 221b combines the vehicle identification code 219 with the service terminal identification code 227 and passes the combination of identification codes to the station controller 203. The station controller 203 associates the vehicle identification code 219 with only the service terminal 220b near which the vehicle is positioned and no other service terminal. Similarly, the station controller 203 inhibits the first service terminal 220b from being associated with any other vehicle. The station controller 203 then authenticates the vehicle identification code 219 and/or service terminal identification code 227 through both access to a local database (not shown) and network access to a distributed database (not shown). When authorized, the station controller sends control signals to the station hardware 229 and to the service port controller 221b for the first service terminal 220b to initiate the pre-coupling service preparation sequence.

FIG. 29 also illustrates the manner in which the identification codes are manipulated in order to produce the sought-after results. The station controller 203 associates the vehicle identification code 219 with the service terminal 220b near which the vehicle 210b is positioned and no other service terminal. Similarly, the station controller 203 inhibits the service terminal 220b from being associated with any other vehicle 210b. The station controller 203 then authenticates the vehicle identification code 219 and/or service terminal identification code 227 through both access to a local database (not shown) and network access to a distributed database (not shown). When authorized, the station controller 203 sends control signals to the service terminal 220b which has recognized the vehicle identification code 219, in order to instruct the service port controller 221b for the service terminal 220b to initiate the pre-coupling service preparation sequence.

With reference again to FIG. 28, a vehicle 210c equipped according to the objects of this invention is shown stopped at service terminal 220c. Automatic coupling of the vehicle 210c to the service terminal 220c by means of the connectivity device 213 and the receptacle 60 has been effected, and fueling and service exchange is enabled.

Figure 30:
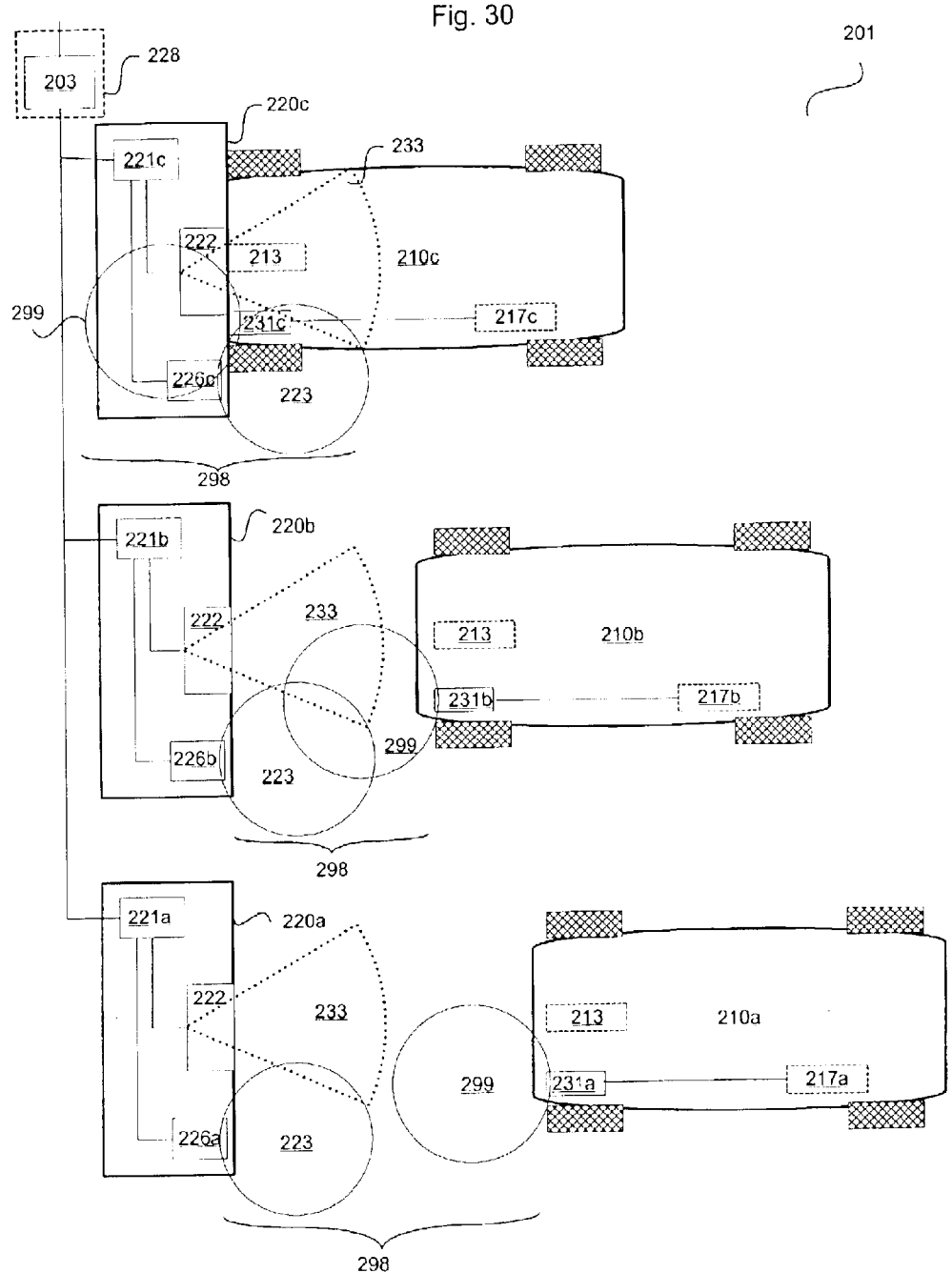
FIG. 30 illustrates the operation of an energy exchange station, in which a transceiver-equipped vehicle approaches and docks with a transceiver-equipped service terminal.
Figure 31:
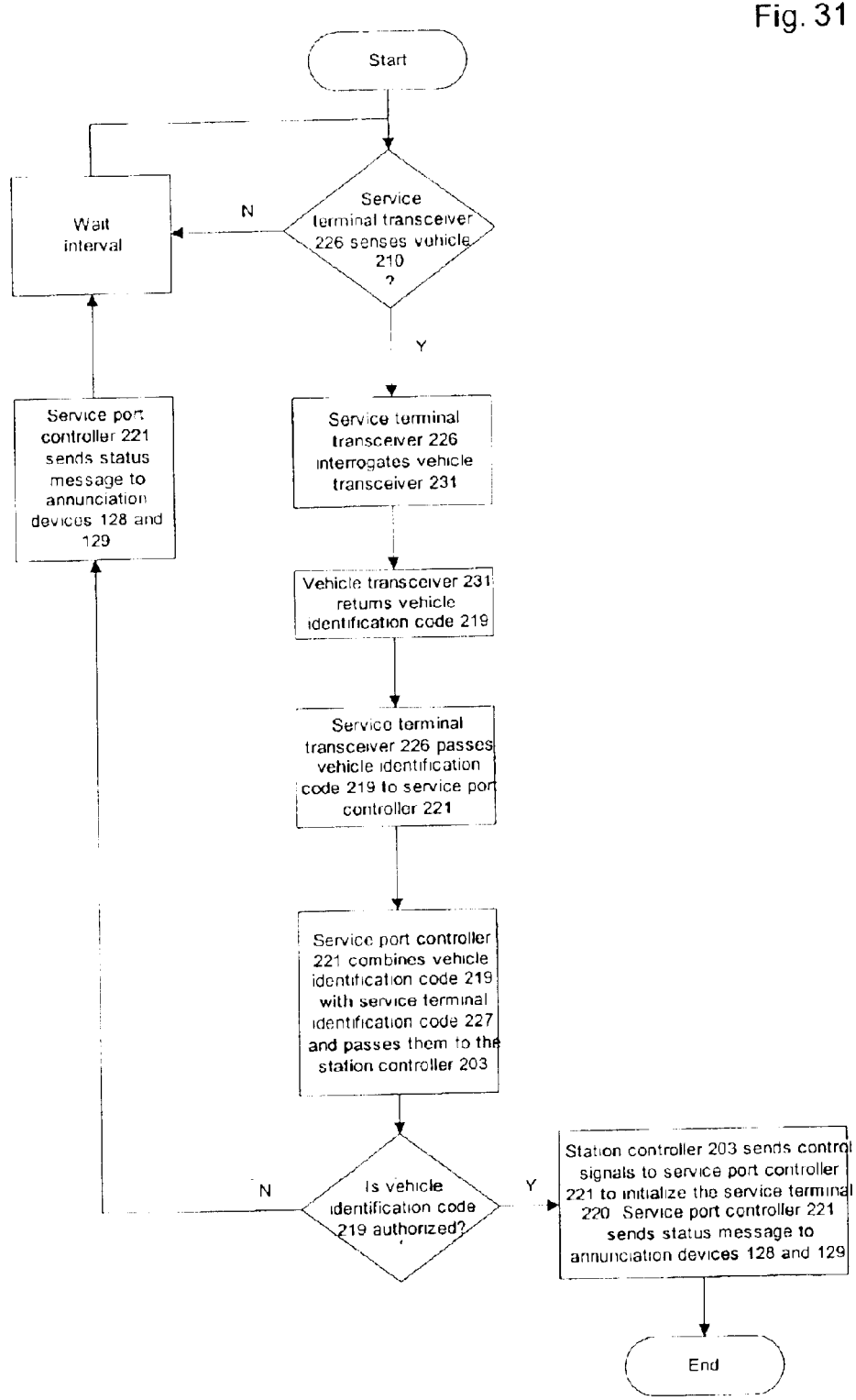
FIG. 31 is a flow chart illustrating the data exchange between a transceiver-equipped vehicle and a transceiver-equipped service terminal at an energy exchange station.

FIGS. 30 and 31 show another embodiment of the present invention in which a vehicle 210a, b, or c, equipped according to the objects of the present invention, includes a vehicle wireless transceiver 231a, b, or c and a vehicle controller 217a, b, or c either of which may contain a unique vehicle identification code 219 and either a connectivity device 213 or a service receptacle 60.

In this embodiment of the present invention, every service terminal 220a, b, or c includes a service terminal wireless transceiver 226a, b, or c and a service port controller 221a, b, or c with a unique service terminal identification code 227 and either a service receptacle 60 or a connectivity device 213, wherein the service terminal delivers or accepts the desired resources, energy and data to or from the vehicle 210a, b or c. The service terminal wireless transceiver 226a, b or c has a sufficiently restricted effective radiated power and is deployed on, in or near the service terminal 220a, b or c such that vehicle identification cannot take place unless the vehicle 210a, b or c is within the zone of proximity detection 223 of a service terminal the service terminal is within the vehicle's zone of proximity detection 299, or the vehicle and service terminal's combined zones of detection 298 overlap, and that the service terminal that is in closest proximity to the vehicle can communicate with the vehicle. A typical zone of proximity detection range is of the order of 50 cm to the front of the wireless transceivers 226a, b or c. Optionally, the zone of proximity detection 223, 299 may be further adjusted by modifying the service terminal wireless transceiver's radiation pattern to effect a narrow beam width.

Also in this embodiment of the present invention, the energy exchange station 201 includes a station controller 203. The station controller 203 includes equipment necessary for the operation of the energy exchange station 201 as defined in the present invention.

In this embodiment of the present invention, FIG. 30 depicts a vehicle 210a entering a service stall 202, while still outside of the zone of proximity detection 223 and has not yet been detected by service terminal wireless transceiver 226a at service terminal 220a.

FIG. 30 also illustrates a vehicle 210b within the zone of proximity detection 223 of the selected service terminal 220b. The service terminal wireless transceiver 226b associated with the service terminal 220b successfully interrogates the vehicle wireless transceiver 231b associated with the vehicle 210b and passes the vehicle identification code 219 received from the vehicle wireless transceiver 231b to the service port controller 221b for that service terminal 220b. The service port controller 221b combines the vehicle identification code 219 with the service terminal identification code 227 and passes the combination of identification codes to the station controller 203. The station controller 203 associates the vehicle identification code 219 with only the service terminal 220b near which the vehicle is positioned and no other service terminal. Similarly, the station controller 203 inhibits the first service terminal 220b from being associated with any other vehicle. The station controller 203 then authenticates the vehicle identification code 219 and/or service terminal identification code 227 through both access to a local database (not shown) and network access to a distributed database (not shown). When authorized, the station controller 203 sends control signals to the station hardware 229 and to the service port controller 221b for the first service terminal 220b to initiate the pre-coupling service preparation sequence.

With reference again to FIG. 30, a vehicle 210c equipped according to the objects of this invention is shown stopped at service terminal 220c. Automatic coupling of the vehicle 210c to the service terminal 220c by means of the connectivity device 213 and the receptacle 60 has been effected, and fueling and service exchange is enabled.

Figure 32:
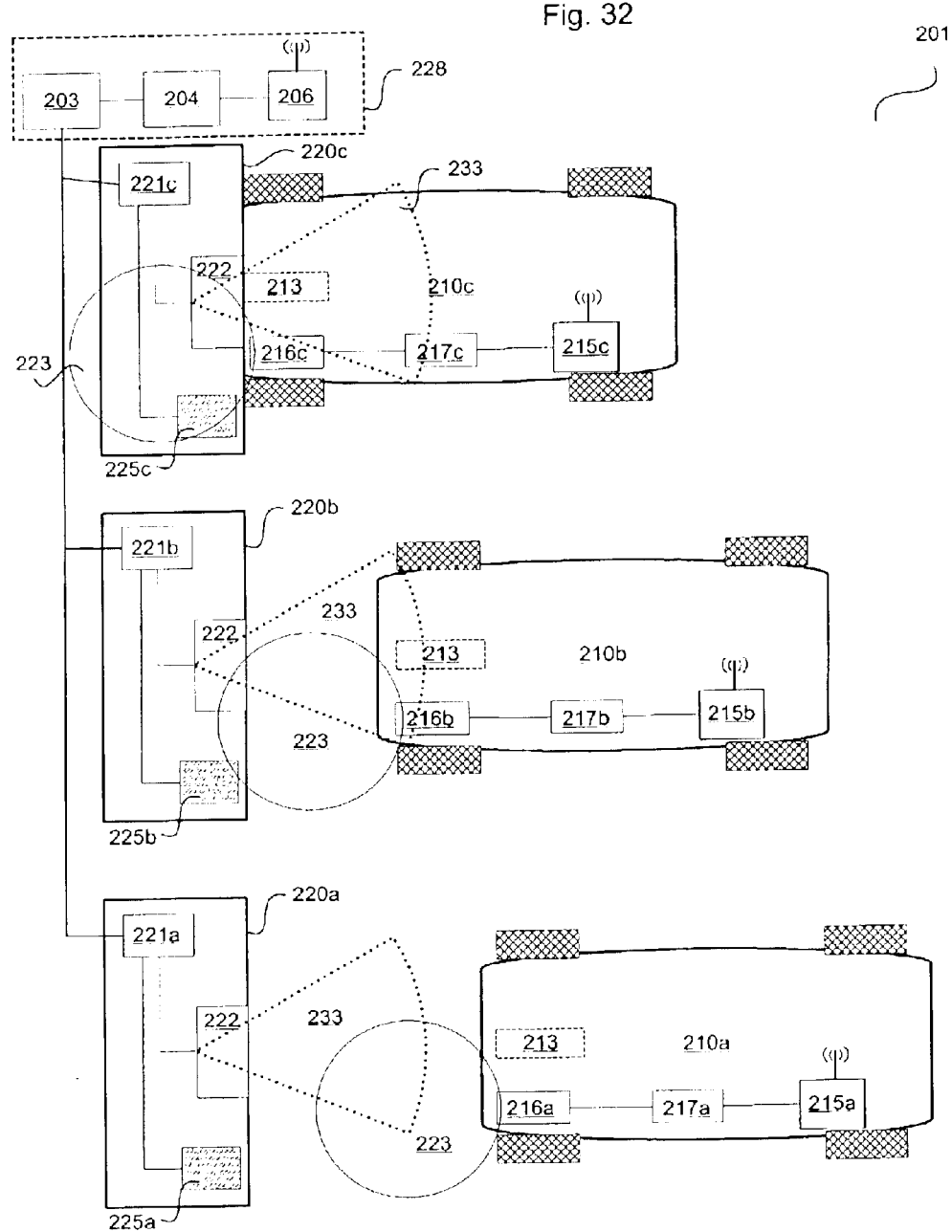
FIG. 32 illustrates the operation of an energy exchange station, in which a transceiver-equipped vehicle approaches and docks with a transponder-equipped service terminal in which the vehicle has a second transceiver for communication with a transceiver-equipped service port controller.
Figure 33:
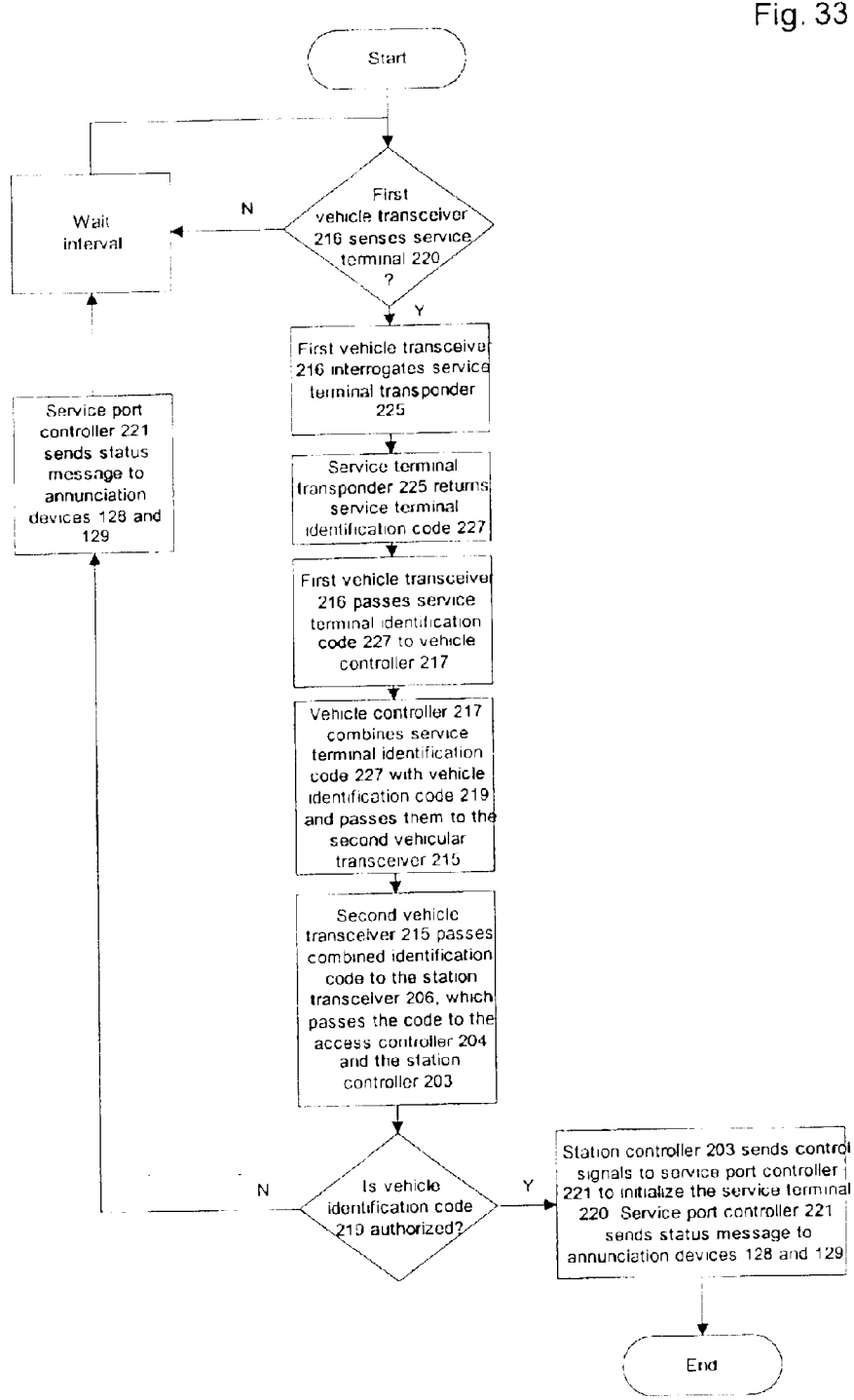
FIG. 33 is a flow chart illustrating the data exchange between a transceiver-equipped vehicle and a transponder-equipped service terminal at an energy exchange station in which the vehicle has a second transceiver for communication with a transceiver-equipped service port controller.

FIGS. 32 and 33 show another embodiment of the present invention in which a vehicle 210a, b, or c equipped according to the objects of the present invention includes a first vehicle wireless transceiver 216a, b, or c, a second vehicle wireless transceiver 215a, b, or c, a vehicle controller 217a, b, or c with a vehicle identification code 219 and either a connectivity device 213, or a service receptacle 60. Both second vehicle wireless transceiver 215a, b, or c and first vehicle wireless transceiver 216a, b, or c require power from the vehicle 210a, b or c for their operation, and are deployed on or in the vehicle in such a way that identification cannot take place unless the service terminal 220a, b, or c is within the zone of proximity detection 223 of a vehicle and such that only the service terminal that is in closest proximity to the service terminal can sense the presence of that specific service terminal.

In this embodiment of the present invention, every service terminal 220a, b, or c includes a transponder 225a, b, or c and a service terminal identification code 227 a service port controller 221a, b, or c, and either a receptacle 60 or a connectivity device 213, wherein the service terminal delivers or accepts the desired resources, energy and data to or from the vehicle 210a, b or c. The transponder 225a, b or c does not require power from the service terminal 220a, b or c for operation, and is deployed on, in or near the service terminal in such a way that service terminal identification cannot take place unless the service terminal is within the zone of proximity detection 223 of that vehicle 210a, b or c and such that only the service terminal that is in closest proximity to the vehicle can be interrogated by that vehicle.

Also in this embodiment of the present invention, the energy exchange station 201 includes a station wireless transceiver 206, a secure wireless access controller 204, and a station controller 203. The station controller 203 includes equipment necessary for the operation of the fueling station as defined in the present invention.

In this embodiment of the present invention, FIG. 32 depicts a vehicle 210a entering a service stall 202, which is still outside of the zone of proximity detection 223 of the vehicle, and that has not yet been detected by the first vehicle wireless transceiver 216a on vehicle 210a.

FIG. 32 also illustrates a service terminal 220b which is within the zone of proximity detection 223 of the vehicle 210b. The first vehicle wireless transceiver 216b successfully interrogates the service terminal transponder 225b and passes the service terminal identification code 227 received from the transponder to the vehicle controller 217b. The vehicle controller 217b combines the service terminal identification code 227 with the vehicle identification code 219 and passes the combination to a second vehicle wireless transceiver 215b. The second vehicle wireless transceiver 215b transmits the combination of identification codes to the station controller 203 via a station wireless transceiver 206 and the secure wireless access controller 204. The station controller 203 associates the vehicle identification code 219 with only the service terminal 220b near which the vehicle is positioned and no other service terminal. Similarly, the station controller 203 inhibits the first service terminal 220b from being associated with any other vehicle. The station controller 203 then authenticates the vehicle identification code 219 and/or service terminal identification code 227 through both access to a local database (not shown) and network access to a distributed database (not shown). When authorized, the station controller 203 sends control signals to the station hardware 229 and to the service port controller 221b for the first service terminal 220b to initiate the pre-coupling service preparation sequence.

With reference again to FIG. 32, a vehicle 210c equipped according to the objects of this invention is shown stopped at service terminal 220c. Automatic coupling of the vehicle 210c to the service terminal 220c by means of the connectivity device 213 and the receptacle 60 has been effected, and fueling and service exchange is enabled.

Figure 34:
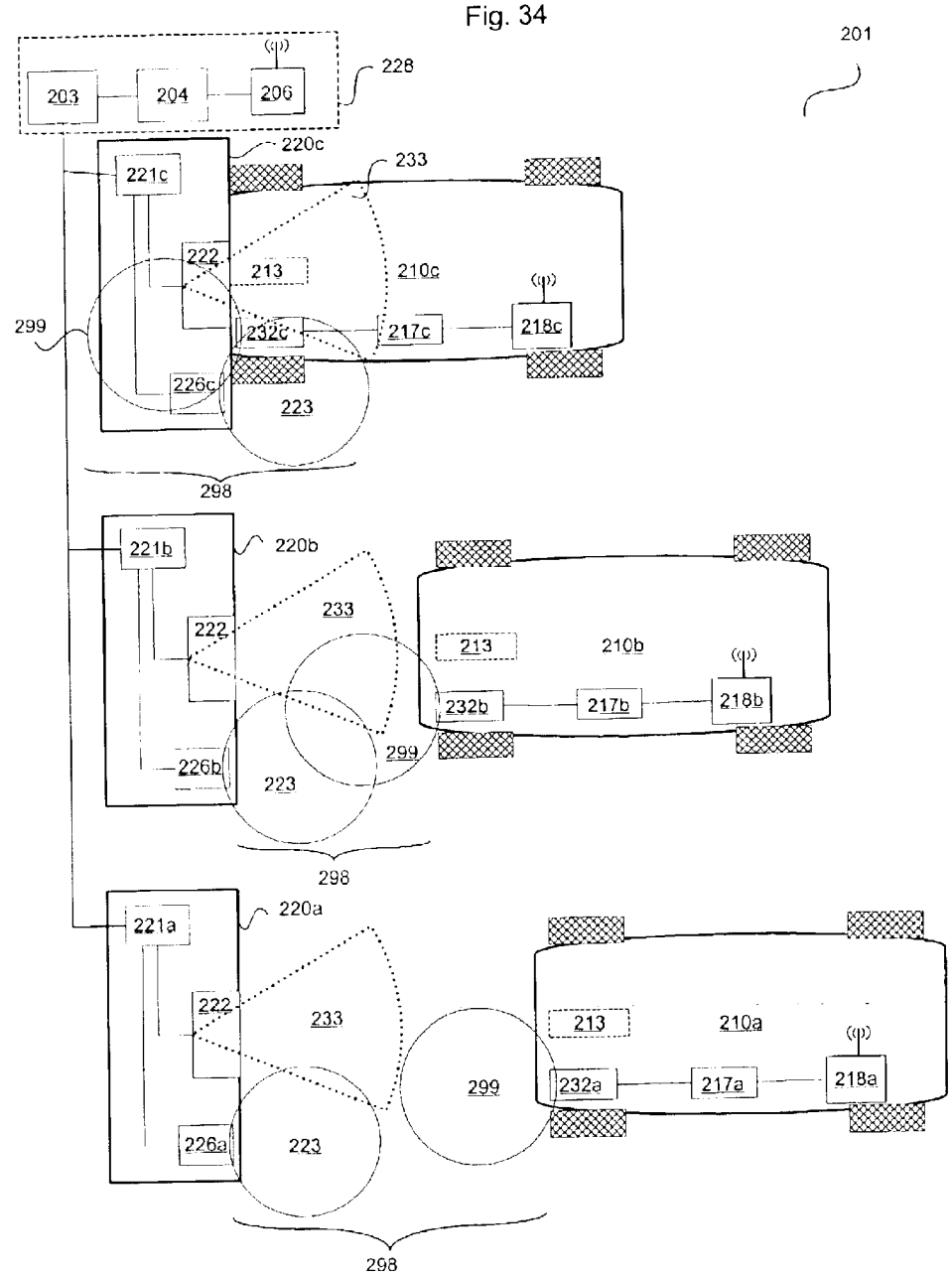
FIG. 34 illustrates the operation of an energy exchange station, in which a transceiver-equipped vehicle approaches and docks with a transceiver-equipped service terminal in which the vehicle has a second transceiver for communication with a transceiver-equipped service port controller.
Figure 35:
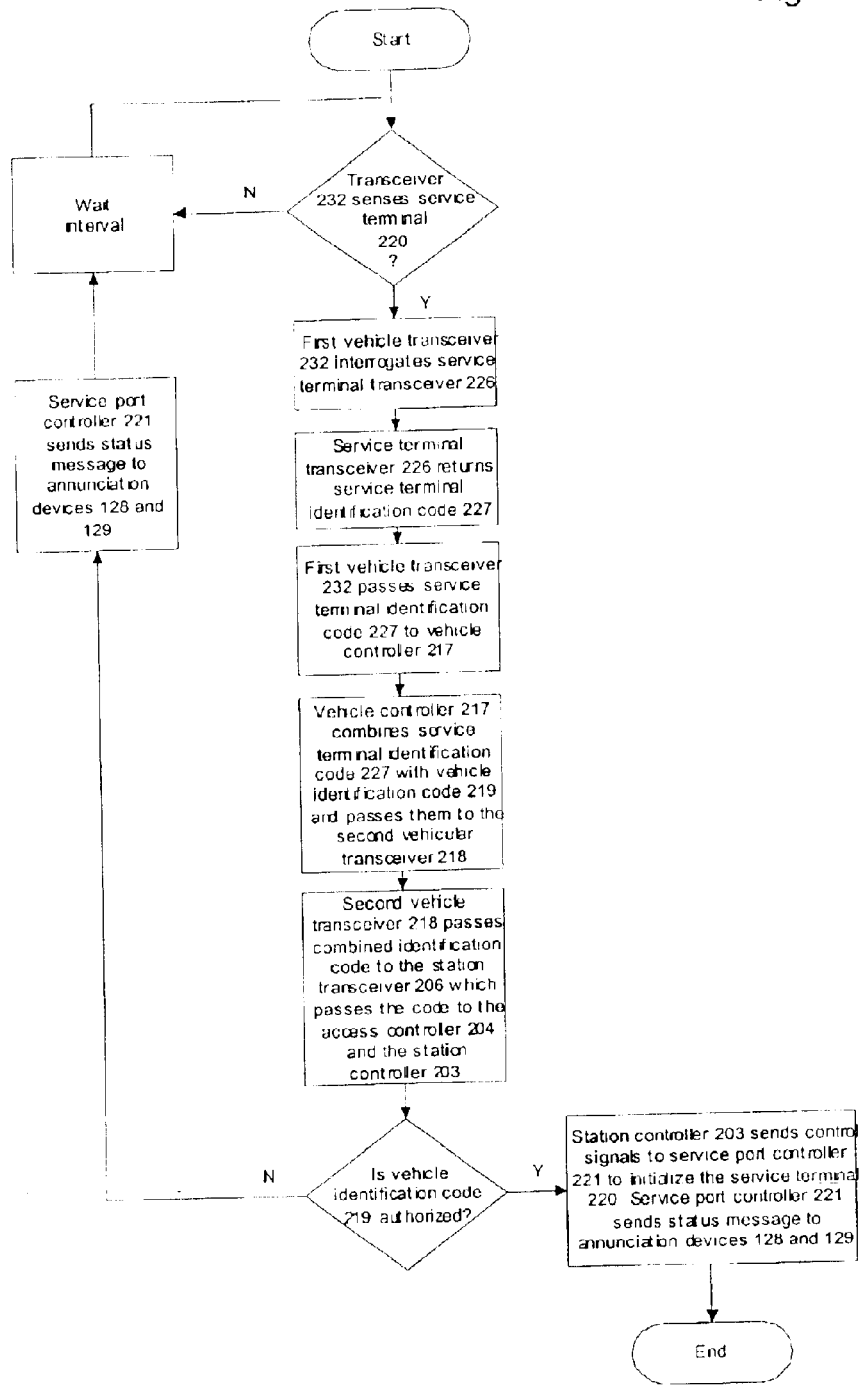
FIG. 35 is a flow chart illustrating the data exchange between a transceiver-equipped vehicle and a transceiver-equipped service terminal at an energy exchange station in which the vehicle has a second transceiver for communication with a transceiver-equipped service port controller.

FIGS. 34 and 35 show another embodiment of the present invention in which a vehicle 210a, b, or c equipped according to the objects of the present invention includes a first vehicle wireless transceiver 232a, b, or c and a vehicle controller 217a, b, or c, either of which may contain a unique vehicle identification code 219 and either a connectivity device 213 or a receptacle 60. The first vehicle wireless transceiver 232a, b, or c has a sufficiently restricted effective radiated power and is deployed on or in the vehicle 210a, b or c such that wireless communications with a service terminal 220a, b, or c cannot take place unless the vehicle is within the service terminal's zone of proximity detection 223 of a service terminal, the service terminal is within the vehicle's zone of proximity detection 299, or the vehicle and service terminal's combined zones of detection 298 overlap, and that the service terminal that is in closest proximity to the vehicle can communicate with that vehicle by way of said transceivers 226a and 232a. A typical zone of proximity detection range is of the order of 50 cm to the front of the wireless transceivers 226a, b or c, and 232a, b or c. Optionally, the zones of proximity detection 223, 299 may be further adjusted by modifying the service terminal wireless transceiver's or the first vehicle wireless transceiver's radiation pattern to effect a narrow beam width. In addition, the vehicle includes a vehicle controller 217a, b, or c as well as a second vehicle wireless transceiver 218a, b, or c that is capable of communicating with a station wireless transceiver 206 while the vehicle 210a, b, or c is within range of the station wireless transceiver. Every service terminal 220a, b, and c includes a service terminal wireless transceiver 226a, b, or c with a service terminal identification code 227, a service port controller 221a, b, or c, and either a service receptacle 60 or a connectivity device 213, wherein the service terminal delivers or accepts the desired resources, energy and data to or from the vehicle. The energy exchange station 201 includes a station wireless transceiver 206, a secure wireless access controller 204, and a station controller 203. The station controller 203 includes equipment necessary for the operation of the energy exchange station 201 as defined in the present invention.

In this embodiment of the present invention, FIGS. 34 and 35 depict a vehicle 210a entering a service stall 202, while still outside of the zone of proximity detection 223 and has not yet been detected by the service terminal wireless transceiver 226a at service terminal 220a, and the service terminal is not within the transceiver's zone of detection 299 and the vehicle and service terminal's combined zones of detection 298 do not overlap.

FIG. 34 also illustrates a vehicle 210b within the zone of proximity detection 223 of the selected service terminal 220b. The first vehicle wireless transceiver 232b associated with the vehicle 210b successfully interrogates the service terminal wireless transceiver 226b associated with the service terminal and passes the service terminal identification code 227 received from the service terminal wireless transceiver 226b to the vehicle controller 217b on the vehicle. The vehicle controller 217b combines the service terminal identification code 227 with the vehicle identification code 219 and passes the combination of identification codes to the second vehicle wireless transceiver 218b. This second vehicle wireless transceiver 218b transmits the combination of identification codes to the station controller 203 via the station wireless transceiver 206 and the secure wireless access controller 204. The station controller 203 associates the vehicle identification code 219 with only the service terminal 220b near which the vehicle is positioned and no other service terminal. Similarly, the station controller 203 inhibits the first service terminal 220b from being associated with any other vehicle. The station controller 203 then authenticates the vehicle identification code 219 and/or service terminal identification code 227 through both access to a local database (not shown) and network access to a distributed database (not shown). When authorized, the station controller sends control signals to the station hardware 229 and to the service port controller 221b for the first service terminal 220b to initiate the pre-coupling service preparation sequence.

With reference again to FIG. 34, a vehicle 210c equipped according to the objects of this invention is shown stopped at service terminal 220c. Automatic coupling of the vehicle 210c to the service terminal 220c by means of the connectivity device 213 and the receptacle 60 has been effected, and fueling and service exchange is enabled.

In all the preceding embodiments the reader and identifier functions may be implemented using a variety of means including but not limited to passive RFID tag and active RFID reader, optical marker and optical marker reader, RF transponder and RF interrogator, ultrasonic transponder and ultrasonic interrogator, bar code label and bar code reader, or bilateral optical apparatus.

In all preceding embodiments, the function of authentication may be processed by an access controller (not shown) connected to each service port controller 221.

It will be evident to those skilled in the art that the communications between vehicle 210, service terminal 220 and station controller 103, 203 may be used for guidance when positioning the vehicle 210 for coupling and are included in this invention.

It will also be evident to those skilled in the art that the communications between a service port controller 221 and the station controller 203 may be wired or wireless and are included in this invention.

Similarly, with reference to FIG. 26, an audible annunciation of the status is provided through an audible annunciation device 129 such as a loudspeaker, and controlled by one of station, port or vehicle controllers 203, 103, 117, 217. The controller sends a status message to an audible annunciation device 129 to emit an audible annunciation. The audible annunciation device 129 generates spoken information that the vehicle 110 is either outside of the zone of proximity detection 223, inside the zone of proximity detection, or is fully docked and, that the service operation has commenced. Likewise, the audible annunciation device 129 generates spoken information that the service terminal 220 is either outside of the vehicle zone of proximity detection 299, or inside the zone of proximity detection, or that the two zones of proximity detection 299, 298 are not overlapping or are overlapping. The audible annunciation device 129 can also indicate when the service process has been completed, such that the vehicle operator may start the vehicle 210, and depart from the energy exchange station 201. The station controller 203 may further control the display of proximity information. In actual deployment, either a visual display 128, or an audible annunciation device 129, or any combination of both may be used, with no loss in generality as to the validity of this invention.

It will be apparent that many modifications and variations can be effected by one skilled in the art without departing from the spirit or scope of the novel concepts of the present invention, so that the scope of the invention should be determined by the appended claims only.

It will be appreciated that the particular type or construction of the various components constituting the vehicle controlling and communications systems are not critical or limiting to either the scope or practice of the present invention. As such, since the hardware implementation of these various components of the present invention will be easily and readily accessible to those skilled in the art of communications systems, these various components have only been referred to generically in the description of the present invention. In this regard, it will become apparent that the novelty of the present invention resides primarily in a unique combination and architectural configuration of these various components in order to generate a specific control and communications function greater than that achievable by the prior art.

The aforementioned embodiments should be regarded as illustrative rather than restrictive, and it should be appreciated that variations may be made other than those discussed, by workers of ordinary skill in the art without departing from the scope of the present invention as defined by the following claims.

What is claimed is:

1. A method of detecting, identifying, authorizing, and polling a vehicle for the purpose of initiating and maintaining an automated coupling and interchange of fuels and services between a fixed service port containing a wireless transceiver, and a couplable vehicle containing a transponder, in which said couplable vehicle is within a zone of proximity detection, the method comprising the steps of:

detecting a location of a vehicle with respect to a fixed service port;

identifying the vehicle by means of reading a unique identification number;

authorizing the initiation of a service interchange sequence;

polling the identifier on a vehicle for the purpose of monitoring during service interchange sequence; and communicating proximity data for coupling or service exchange processes through a controller located at a fixed service port.

2. A method as claimed in claim 1 wherein the steps of identifying and authorizing include combining and processing of identification codes of the vehicle with those of the fixed service port, at the fixed service port.

3. A method as claimed in claim 2 wherein the step of processing includes the step of accessing a local database to determine vehicle authorization status.

4. A method as claimed in claim 2 wherein the step of processing includes the step of establishing a communications link with a remote database to determine vehicle authorization status.

5. A method as claimed in claim 1 wherein the steps of detecting and identifying include transmitting a wireless signal of constrained shape and range for establishing a zone of proximity detection, from the fixed service port to the vehicle, and receiving a wireless signal from a transponder located on the vehicle, by the fixed service port.

6. A method as claimed in claim 5 wherein said zone of proximity detection significantly overlaps a coupling range for the vehicle.

7. A method as claimed in claim 1 wherein the step of polling includes the step of polling a vehicle identifier from a fixed service port.

8. A method as claimed in claim 7 wherein the step of polling includes the step of monitoring vehicle identity from a fixed service port.

9. A method as claimed in claim 1 wherein the steps of detecting and identifying include transmitting a wireless signal of constrained shape and range for establishing a zone of proximity detection, from the fixed service port to the vehicle, and receiving a wireless signal from a wireless transceiver located on the vehicle, by the fixed service port.

10. A method as claimed in claim 9 wherein said zone of proximity detection significantly overlaps a coupling range for the vehicle.

11. A method as claimed in claim 9 wherein the steps of identifying and authorizing include combining and processing identification codes of the vehicle and the fixed service port.

12. A method as claimed in claim 11 wherein the step of processing includes the step of accessing a local database to determine vehicle authorization status.

13. A method as claimed in claim 11 wherein the step of processing includes the step of establishing a communications link with a remote database to determine vehicle authorization status.

14. A method as claimed in claim 9 wherein each step of detecting, identifying, authorizing, and polling includes the step of the transmission of process control data from the vehicle to the fixed service port.

15. A method as claimed in claim 9 wherein the step of polling includes the step of polling a vehicle identifier from a fixed service port.

16. A method as claimed in claim 15 wherein the step of polling includes the step of monitoring vehicle identity from a fixed service port.

17. A system for detecting, identifying, authorizing, and polling a couplable vehicle having a transponder located at a defined location on said couplable vehicle for the purpose of initiating and maintaining an automated coupling and interchange of fuels and services between said couplable vehicle and a fixed service port in which said couplable vehicle is within a zone of proximity detection from said fixed service port, comprising:
 a fixed service port comprising a wireless transceiver system located at a defined location at the fixed service port that transmits a signal constrained in range and radiation pattern and is capable of receiving a vehicle transponder response for establishing a zone of proximity detection in a fixed relative position to a couplable range;
 a controller associated with the fixed service port and connected to the wireless transceiver system for controlling the data flow and processing required for the detecting, identifying, authorizing, and polling of a couplable vehicle within couplable range.

18. A system as claimed in claim 17 wherein said transponder is a passive device.

19. A system as claimed in claim 17 wherein said transponder is a wireless transceiver.

20. A system as claimed in claim 17 including a database for storing records of vehicle authorization status.

21. A system as claimed in claim 17 including a network access device for retrieval of vehicle authorization status.

22. A system as claimed in claim 17 wherein said controller performs the function of combining the sensed vehicle identification code and associated port identification code into a combined vehicle-port identification code.

23. A system as claimed in claim 17 wherein said controller performs the functions of accessing at least one of local and remote databases for the purpose of vehicle authorizing, utilizing said combined vehicle-port identification code.

24. A system as claimed in claim 17 wherein said wireless transceiver system includes one or more of optical, radio, microwave, and acoustical and ultrasonic transducers for the purpose of interrogating a corresponding vehicle transponder responsive to the selected transducer.

25. A method of detecting, identifying, authorizing, and polling a port and a vehicle for the purpose of initiating and maintaining an automated coupling and interchange of fuels and services between a couplable vehicle containing an active wireless transceiver for establishing a zone of proximity detection, and a fixed service port containing a transponder and a wireless access port, the method comprising the steps of:
 detecting a location of a port with respect to a couplable vehicle;
 identifying the port by means of a unique identification number located in a transponder;
 authorizing the initiation of a service interchange sequence;
 polling the transponder on a port for the purpose of monitoring during service interchange sequence; and
 communicating proximity data for coupling or service exchange processes through a controller located on a vehicle.

26. A method as claimed in claim 25 wherein the steps of identifying and authorizing include combining and processing of identification codes of the vehicle with those of the fixed service port, by the vehicle controller.

27. A method as claimed in claim 26 wherein the step of processing includes the step of transmitting a wireless signal from the vehicle wireless system to the fixed access port.

28. A method as claimed in claim 26 wherein the step of processing includes the step of accessing a local database through a second wireless transceiver to determine vehicle authorization status.

29. A method as claimed in claim 26 wherein the step of processing includes the step of establishing a communications link with a remote database to determine vehicle authorization status.

30. A method as claimed in claim 25 wherein the steps of detecting and identifying include transmitting a wireless signal of constrained pattern and range for establishing a zone of proximity detection, from the vehicle to the fixed service port, and receiving a wireless signal from a transponder located on the fixed service port, by a vehicle.

31. A method as claimed in claim 30 wherein said zone of proximity detection significantly overlaps a coupling range for the vehicle.

32. A method as claimed in claim 25 wherein the step of polling includes the step of polling vehicle and port identification codes by a vehicle.

33. A method as claimed in claim 32 wherein the step of polling includes the step of wireless transmission of vehicle and port status from the vehicle to the fixed service port.

34. A method as claimed in claim 25 wherein the steps of detecting and identifying include transmitting a wireless signal of constrained pattern and range for establishing a zone of proximity detection, from the vehicle to the fixed service port, and receiving a wireless signal from a wireless transceiver located on the fixed service port, by the vehicle.

35. A method as claimed in claim 34 wherein said zone of proximity detection significantly overlaps a coupling range for the vehicle.

36. A method as claimed in claim 35 wherein the step of polling includes the step of polling the fixed service port from the vehicle.

37. A method as claimed in claim 36 wherein the step of polling includes the step of wireless transmission of vehicle and port proximity detection status from the vehicle to the fixed service port.

38. A method as claimed in claim 34 wherein the steps of identifying and authorizing include combining and processing identification codes of the vehicle with the identification codes of the fixed service port into a combined vehicle-port identification codes.

39. A method as claimed in claim 38 wherein the step of processing includes the step of accessing a local database to determine vehicle authorization status, utilizing said combined vehicle-port identification codes.

40. A method as claimed in claim 39 wherein the step of processing includes the step of establishing a communications link with a remote database to determine vehicle authorization status, utilizing said combined vehicle-port identification codes.

41. A method as claimed in claim 34 wherein each step of detecting, identifying, authorizing, and polling includes the step of transmitting process control data from the fixed service port to the vehicle.

42. A system for detecting, identifying, authorizing, and polling a couplable vehicle and a fixed service port having a transponder located at a defined location on said fixed service port, including a port controller, for the purpose of initiating and maintaining an automated coupling and interchange of fuels and services between a couplable vehicle and a fixed service port in which said fixed service port is within a zone of proximity detection from said couplable vehicle, comprising:
    a couplable vehicle having a first wireless transceiver system located at a defined location which transmits a signal constrained in range and radiation pattern and is capable of receiving a port transponder response, to form a zone of proximity detection in a fixed relative position to a couplable range; and
    a second wireless transceiver system located on said couplable vehicle for the purpose of communicating with the fixed service port; and
    a controller located on the couplable vehicle and connected to the first and second wireless transceivers, for controlling the data flow and processing required for the detecting, identifying, authorizing, and polling of said couplable vehicle.

43. A system as claimed in claim 42 wherein said transponder is a passive device.

44. A system as claimed in claim 42 wherein said transponder is a wireless transceiver.

45. A system as claimed in claim 42 including a local database for storing records of vehicle authorization status, accessible to the second wireless transceiver system.

46. A system as claimed in claim 42 including a network access device accessible to the second wireless transceiver system for retrieval of vehicle authorization status.

47. A system as claimed in claim 42 wherein said controller performs the function of combining vehicle identification codes and port identification codes, to produce a combined vehicle-port identification codes.

48. A system as claimed in claim 42 wherein said controller performs the functions of accessing at least one of local and remote databases for the purpose of vehicle authorizing, utilizing the combined vehicle-port identification codes.

49. A system as claimed in claim 42 including a controller associated with the fixed service port for controlling the data flow and processing required for the detecting, identifying, authorizing, and polling of a vehicle within couplable range.

50. A system as claimed in claim 42 including a third wireless system located at the fixed service port for the purpose of communicating with the couplable vehicle.

51. A system as claimed in claim 42 wherein said first wireless transceiver system includes one or more of optical, radio, microwave, acoustical and ultrasonic transducers for the purpose of interrogating a corresponding vehicle transponder responsive to the selected transducer.

52. A method of detecting, identifying, authorizing, and polling a vehicle or a port for the purpose of initiating and maintaining an automated coupling and interchange of fuels and services between a couplable vehicle and one of a number of fixed service ports, in which said couplable vehicle is within a zone of proximity detection, the method comprising the steps of:
    detecting a location of a couplable vehicle with respect to one of a number of fixed service ports;
    identifying the vehicle or the port or both by means of reading identification numbers;
    authorizing the initiation of a service interchange sequence;
    polling the identifier on the vehicle and the port for the purpose of monitoring during service interchange sequence; and
    communicating the proximity data for coupling or service exchange processes through a central controller located at a fixed station.

53. A method as claimed in claim 52 wherein the number of fixed service ports is two.

54. A method as claimed in claim 52 wherein each step of identifying and authorizing includes the step of establishing a communications link with a remote database to determine vehicle authorization status.

55. A method as claimed in claim 52 wherein the steps of detecting and identifying include the inhibiting of all ports other than the selected port from any form of interchange or connection with said vehicle.

56. A method as claimed in claim 52 wherein the steps of detecting and identifying are confined to wireless zones of proximity detection which are constrained in shape, range, frequency, coding, and modulation such that no other vehicles or ports can communicate with said vehicle or said fixed service port, or one another.

57. A method as claimed in claim 52 wherein all information is transmitted wirelessly from the vehicle to the fixed station.

58. A method as claimed in claim 52 wherein the number of fixed service ports is greater than two.

59. A method as claimed in claim 52 wherein the steps of identifying and authorizing include the step of reading a unique vehicle identification code.

60. A method as claimed in claim 52 wherein each step of identifying and authorizing includes the step of reading a non-unique vehicle identification code in which vehicle identification is limited to vehicle type or make.

61. A system for detecting, identifying, authorizing, and polling a couplable vehicle for the purpose of initiating and maintaining an automated coupling and interchange of fuels and services between said vehicle and one of a multiplicity of fixed service ports at a station in which said vehicle is within a zone of proximity detection from one of said fixed service ports, comprising:
    a wireless transceiver system located at a defined location at each fixed service port for transmitting a signal constrained in range and radiation pattern for establishing a zone of proximity detection which significantly overlaps a couplable range;

a transponder located at a defined location on the couplable vehicle;

a controller associated with each said fixed service port; and a station controller located at the station and linked to port controllers at all station ports and couplable vehicles within couplable range for overall monitoring and control of all fixed service ports located at the station and all vehicles within couplable range.

62. A system as claimed in claim 61 wherein said transponder is a passive device.

63. A system as claimed in claim 61 wherein said transponder is a wireless transceiver.

64. A system as claimed in claim 61 wherein said station controller includes modules for constraining a single vehicle identification code to have a unique association with only one fixed service port identification code at any one instance.

65. A system as claimed in claim 61 including modules for limiting said wireless transceiver systems to communications with a single couplable vehicle at any one instance.

66. A system as claimed in claim 61 wherein one of associated controller and said station controller performs the function of combining vehicle identification codes and port identification codes.

67. A system as claimed in claim 61 wherein one of said associated controller or said station controller performs the functions of accessing at least one of local and remote databases for the purpose of vehicle authorizing.

68. A system as claimed in claim 61, including a database accessible to one of said associated controller or said station controller, for storing records of vehicle authorization status.

69. A system as claimed in claim 61, including a network access device for retrieval of vehicle authorization status.

70. A system as claimed in claim 61 wherein said wireless transceiver system includes one or more of optical, radio, microwave, acoustical and ultrasonic transducers for the purpose of interrogating a corresponding vehicle transponder responsive to the selected transducer.

71. A system for detecting, identifying, authorizing, and polling a couplable vehicle and a fixed service port for the purpose of initiating and maintaining an automated coupling and interchange of fuels and services between said couplable vehicle and one of a multiplicity of fixed service ports at a station in which said fixed service port is within a zone of proximity detection from a vehicle, comprising:

a wireless transceiver system located at a defined first location on each said couplable vehicle that transmits a signal constrained in range and radiation pattern for establishing a zone of proximity detection which significantly overlaps a couplable range;

a transponder located at a defined location on each fixed service port;

a controller associated with each said fixed service port;

a station controller located at the station and linked to port controllers at all station ports and couplable vehicles within couplable range for overall monitoring and control of all fixed service ports located at the station and all vehicles within couplable range;

a vehicle controller located on each couplable vehicle for controlling the data flow and processing required for the detecting, identifying, authorizing, and polling of a vehicle;

a second wireless system located on a couplable vehicle for the purpose of communications between said vehicle controllers and the station; and a wireless access port located at the station for the purpose of communications between couplable vehicles and the station controller.

72. A system as claimed in claim 71 wherein said transponder is a passive device.

73. A system as claimed in claim 71 wherein said transponder is a wireless transceiver.

74. A system as claimed in claim 71 wherein said station controller includes modules for constraining a single vehicle identification code to have a unique association with only one fixed service port identification code at any one time.

75. A system as claimed in claim 71 including modules for limiting said wireless transceiver systems to communications with a single fixed access port at any one instance.

76. A system as claimed in claim 71, including a database for storing records of vehicle authorization status.

77. A system as claimed in claim 71 wherein one of said associated controller, vehicle controller and station controller performs the function of combining vehicle and port identification codes.

78. A system as claimed in claim 71 wherein one of said associated controller, vehicle controller and station controller performs the functions of accessing at least one of local and remote databases for the purpose of vehicle authorizing.

79. A system as claimed in claim 71, including a network access device connected to one of said station controller, vehicle controller or associated controller for retrieval of vehicle authorization status.

80. A system as claimed in claim 71 wherein said wireless transceiver system includes one or more of optical, radio, microwave, acoustical and ultrasonic transducers for the purpose of interrogating a corresponding vehicle transponder responsive to the selected transducer.

\* \* \* \* \*